United States Patent
James et al.

(10) Patent No.: US 7,958,531 B2
(45) Date of Patent: Jun. 7, 2011

(54) AUTOMATIC LEVEL CONTROL FOR INCOMING SIGNALS OF DIFFERENT SIGNAL STRENGTHS

(75) Inventors: Thomas H. James, Pacific Palisades, CA (US); Dipak M. Shah, Westminster, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 823 days.

(21) Appl. No.: 11/097,480

(22) Filed: Apr. 1, 2005

(65) Prior Publication Data
US 2006/0259929 A1 Nov. 16, 2006

(51) Int. Cl.
*H04N 7/20* (2006.01)
*H04H 20/74* (2008.01)

(52) U.S. Cl. ............... 725/63; 725/67; 725/68; 725/71; 725/72; 455/3.02

(58) Field of Classification Search ............ 725/63–72, 725/127; 455/3.04–3.06, 3.02, 136, 127.4, 455/232.1, 234.4, 247.1
See application file for complete search history.

(56) References Cited

U.S. PATENT DOCUMENTS

| | | | |
|---|---|---|---|
| 3,581,209 A | 5/1971 | Zimmerman | |
| 3,670,275 A | 6/1972 | Kalliomaki et al. | |
| 4,064,460 A | 12/1977 | Gargini | |
| 4,132,952 A | 1/1979 | Hongu et al. | |
| 4,354,167 A | 10/1982 | Terreault et al. | |
| 4,382,266 A | 5/1983 | Panzer | |
| 4,397,037 A | 8/1983 | Theriault | |
| 4,403,343 A | 9/1983 | Hamada | |
| 4,509,198 A | 4/1985 | Nagatomi | |
| 4,513,315 A | 4/1985 | Dekker et al. | |
| 4,530,008 A | 7/1985 | McVoy | |
| 4,532,543 A | 7/1985 | Groenewegen | |
| 4,538,175 A | 8/1985 | Balbes et al. | |
| 4,545,075 A | 10/1985 | Miller et al. | |
| 4,556,988 A | 12/1985 | Yoshisato | |

(Continued)

FOREIGN PATENT DOCUMENTS

CN 1413021 4/2003

(Continued)

OTHER PUBLICATIONS

U.S. Appl. No. 10/255,344, filed Sep. 25, 2002, Thomas H. James, Non-final Communication dated Aug. 1, 2007.

(Continued)

*Primary Examiner* — Christopher Kelley
*Assistant Examiner* — Alazar Tilahun

(57) ABSTRACT

An automatic level controlled system for delivering satellite signals to at least one Integrated Receiver Decoder (IRD). The system includes a plurality of inputs, designed to receive a plurality of satellite signals, wherein the satellite signals are directed to the inputs based on an originating satellite for each of the satellite signals, an automatic level controller, coupled to the inputs, for adjusting a signal strength associated with each the satellite signals such that each of the signal strengths are within a predetermined range, a multiswitch, having a plurality of inputs and a plurality of outputs, wherein at least one input of the multiswitch is coupled to the automatic level controller, and an interface, wherein at least one of the outputs of the multiswitch provides a signal to the interface, such that at least one new IRD coupled to an output of the interface receives a portion of a satellite signal based on commands sent to the interface from the new IRD.

20 Claims, 14 Drawing Sheets

U.S. PATENT DOCUMENTS

| | | | |
|---|---|---|---|
| 4,592,093 A | 5/1986 | Ouchi et al. | |
| 4,608,710 A | 8/1986 | Sugiura | |
| 4,628,506 A | 12/1986 | Sperlich | |
| 4,656,486 A | 4/1987 | Turner | |
| 4,663,513 A | 5/1987 | Webber | |
| 4,667,243 A | 5/1987 | Blatter et al. | |
| 4,672,687 A | 6/1987 | Horton et al. | |
| 4,675,732 A | 6/1987 | Oleson | |
| 4,710,972 A | 12/1987 | Hayashi et al. | |
| 4,723,320 A | 2/1988 | Horton | |
| 4,761,825 A | 8/1988 | Ma | |
| 4,761,827 A | 8/1988 | Horton et al. | |
| 4,785,306 A | 11/1988 | Adams | |
| 4,802,239 A | 1/1989 | Ooto | |
| 4,805,014 A | 2/1989 | Sahara et al. | |
| 4,813,036 A | 3/1989 | Whitehead | |
| 4,823,135 A | 4/1989 | Hirashima et al. | |
| 4,860,021 A | 8/1989 | Kurosawa et al. | |
| 4,866,787 A | 9/1989 | Olesen | |
| 4,876,736 A | 10/1989 | Kiewit | |
| 4,885,803 A | 12/1989 | Hermann et al. | |
| 4,903,031 A | 2/1990 | Yamada | |
| 4,945,410 A | 7/1990 | Walling | |
| 5,010,400 A | 4/1991 | Oto | |
| 5,027,430 A | 6/1991 | Yamauchi et al. | |
| 5,068,918 A | 11/1991 | Verheijen et al. | |
| 5,073,930 A | 12/1991 | Green et al. | |
| 5,119,509 A | 6/1992 | Kang | |
| 5,235,619 A | 8/1993 | Beyers, II et al. | |
| 5,249,043 A | 9/1993 | Grandmougin | |
| 5,276,904 A | 1/1994 | Mutzig et al. | |
| 5,289,272 A | 2/1994 | Rabowsky et al. | |
| 5,301,352 A | 4/1994 | Nakagawa et al. | |
| 5,382,971 A | 1/1995 | Chanteau | |
| 5,437,051 A | 7/1995 | Oto | |
| 5,521,631 A | 5/1996 | Budow et al. | |
| 5,565,805 A | 10/1996 | Nakagawa et al. | |
| 5,572,517 A | 11/1996 | Safadi | |
| 5,574,964 A | 11/1996 | Hamlin | |
| 5,587,734 A | 12/1996 | Lauder et al. | |
| 5,617,107 A | 4/1997 | Fleming | |
| 5,649,318 A | 7/1997 | Lusignan | |
| 5,675,390 A | 10/1997 | Schindler et al. | |
| 5,708,961 A | 1/1998 | Hylton et al. | |
| 5,734,356 A | 3/1998 | Chang | |
| 5,748,732 A | 5/1998 | Le Berre et al. | |
| 5,760,819 A | 6/1998 | Sklar et al. | |
| 5,760,822 A | 6/1998 | Coutinho | |
| 5,787,335 A | 7/1998 | Novak | |
| 5,790,202 A | 8/1998 | Kummer et al. | |
| 5,793,413 A | 8/1998 | Hylton et al. | |
| 5,805,806 A | 9/1998 | McArthur | |
| 5,805,975 A | 9/1998 | Green et al. | |
| 5,835,128 A | 11/1998 | Macdonald et al. | |
| 5,838,740 A | 11/1998 | Kallman et al. | |
| 5,848,239 A | 12/1998 | Ando | |
| 5,864,747 A | 1/1999 | Clark et al. | |
| 5,883,677 A | 3/1999 | Hofmann | |
| 5,886,995 A | 3/1999 | Arsenault et al. | |
| 5,898,455 A | 4/1999 | Barakat et al. | |
| 5,905,941 A | 5/1999 | Chanteau | |
| 5,905,942 A | 5/1999 | Stoel et al. | |
| 5,923,288 A | 7/1999 | Pedlow, Jr. | |
| 5,936,660 A | 8/1999 | Gurantz | |
| 5,959,592 A | 9/1999 | Petruzzelli | |
| 5,970,386 A | 10/1999 | Williams | |
| 5,982,333 A | 11/1999 | Stillinger et al. | |
| 6,005,861 A | 12/1999 | Humpleman | |
| 6,011,597 A | 1/2000 | Kubo | |
| 6,023,603 A | 2/2000 | Matsubara | |
| 6,038,425 A | 3/2000 | Jeffrey | |
| 6,100,883 A | 8/2000 | Hoarty | |
| 6,104,908 A | 8/2000 | Schaffner et al. | |
| 6,134,419 A | 10/2000 | Williams | |
| 6,147,714 A | 11/2000 | Terasawa et al. | |
| 6,173,164 B1 | 1/2001 | Shah | |
| 6,188,372 B1 | 2/2001 | Jackson et al. | |
| 6,192,399 B1 | 2/2001 | Goodman | |
| 6,198,449 B1 | 3/2001 | Muhlhauser et al. | |
| 6,198,479 B1 | 3/2001 | Humpleman et al. | |
| 6,202,211 B1 | 3/2001 | Williams, Jr. | |
| 6,292,567 B1 | 9/2001 | Marland | |
| 6,304,618 B1 | 10/2001 | Hafeez et al. | |
| 6,340,956 B1 | 1/2002 | Bowen et al. | |
| 6,397,038 B1 | 5/2002 | Green, Sr. et al. | |
| 6,424,817 B1 | 7/2002 | Hadden | |
| 6,430,233 B1 | 8/2002 | Dillon et al. | |
| 6,430,742 B1 | 8/2002 | Chanteau | |
| 6,441,797 B1 | 8/2002 | Shah | |
| 6,442,148 B1 * | 8/2002 | Adams et al. | 370/325 |
| 6,452,991 B1 | 9/2002 | Zak | |
| 6,463,266 B1 | 10/2002 | Shohara | |
| 6,486,907 B1 | 11/2002 | Farber et al. | |
| 6,493,873 B1 | 12/2002 | Williams | |
| 6,493,874 B2 | 12/2002 | Humpleman | |
| 6,501,770 B2 | 12/2002 | Arsenault et al. | |
| 6,510,152 B1 | 1/2003 | Gerszberg et al. | |
| 6,549,582 B1 | 4/2003 | Friedman | |
| 6,574,235 B1 | 6/2003 | Arslan et al. | |
| 6,598,231 B1 | 7/2003 | Basawapatna et al. | |
| 6,600,730 B1 | 7/2003 | Davis et al. | |
| 6,600,897 B1 | 7/2003 | Watanabe et al. | |
| 6,622,307 B1 | 9/2003 | Ho | |
| 6,653,981 B2 | 11/2003 | Wang et al. | |
| 6,728,513 B1 | 4/2004 | Nishina | |
| 6,762,727 B2 | 7/2004 | Rochford et al. | |
| 6,864,855 B1 | 3/2005 | Fujita | |
| 6,865,193 B2 | 3/2005 | Terk | |
| 6,879,301 B2 | 4/2005 | Kozlovski | |
| 6,889,385 B1 | 5/2005 | Rakib et al. | |
| 6,906,673 B1 | 6/2005 | Matz et al. | |
| 6,941,576 B2 | 9/2005 | Amit | |
| 6,944,878 B1 | 9/2005 | Wetzel et al. | |
| 7,010,265 B2 | 3/2006 | Coffin, III | |
| 7,016,643 B1 * | 3/2006 | Kuether et al. | 455/3.02 |
| 7,020,081 B1 | 3/2006 | Tani et al. | |
| 7,039,169 B2 | 5/2006 | Jones | |
| 7,069,574 B1 | 6/2006 | Adams et al. | |
| 7,085,529 B1 | 8/2006 | Arsenault et al. | |
| 7,130,576 B1 * | 10/2006 | Gurantz et al. | 455/3.02 |
| 7,239,285 B2 | 7/2007 | Cook | |
| 7,245,671 B1 | 7/2007 | Chen et al. | |
| 7,257,638 B2 | 8/2007 | Celik et al. | |
| 7,260,069 B2 | 8/2007 | Ram et al. | |
| 7,263,469 B2 * | 8/2007 | Bajgrowicz et al. | 702/189 |
| 7,519,680 B1 | 4/2009 | O'Neil | |
| 7,522,875 B1 | 4/2009 | Gurantz et al. | |
| 7,542,715 B1 | 6/2009 | Gurantz et al. | |
| 7,603,022 B2 | 10/2009 | Putterman et al. | |
| 2001/0055319 A1 | 12/2001 | Quigley et al. | |
| 2002/0044614 A1 | 4/2002 | Molnar | |
| 2002/0140617 A1 | 10/2002 | Luly et al. | |
| 2002/0152467 A1 | 10/2002 | Fiallos | |
| 2002/0154055 A1 | 10/2002 | Davis et al. | |
| 2002/0154620 A1 | 10/2002 | Azenkot et al. | |
| 2002/0178454 A1 | 11/2002 | Antoine et al. | |
| 2002/0181604 A1 | 12/2002 | Chen | |
| 2003/0023978 A1 | 1/2003 | Bajgrowicz | |
| 2003/0129960 A1 | 7/2003 | Kato | |
| 2003/0185174 A1 | 10/2003 | Currivan | |
| 2003/0217362 A1 | 11/2003 | Summers et al. | |
| 2003/0220072 A1 | 11/2003 | Coffin, III | |
| 2004/0060065 A1 | 3/2004 | James et al. | |
| 2004/0064689 A1 | 4/2004 | Carr | |
| 2004/0068747 A1 | 4/2004 | Robertson et al. | |
| 2004/0136455 A1 | 7/2004 | Akhter et al. | |
| 2004/0153942 A1 | 8/2004 | Shtutman et al. | |
| 2004/0161031 A1 | 8/2004 | Kwentus et al. | |
| 2004/0184521 A1 | 9/2004 | Chen et al. | |
| 2004/0192190 A1 | 9/2004 | Motoyama | |
| 2004/0198237 A1 | 10/2004 | Abutaleb et al. | |
| 2004/0203425 A1 * | 10/2004 | Coffin, III | 455/67.11 |
| 2004/0214537 A1 * | 10/2004 | Bargroff et al. | 455/136 |
| 2004/0229583 A1 | 11/2004 | Ogino | |
| 2004/0244044 A1 | 12/2004 | Brommer | |
| 2004/0244059 A1 | 12/2004 | Coman | |
| 2004/0255229 A1 | 12/2004 | Shen et al. | |

| | | | |
|---|---|---|---|
| 2004/0261110 A1 | 12/2004 | Kolbeck et al. | |
| 2005/0002640 A1 | 1/2005 | Putterman et al. | |
| 2005/0033846 A1 | 2/2005 | Sankaranarayan et al. | |
| 2005/0052335 A1 | 3/2005 | Chen | |
| 2005/0054315 A1 | 3/2005 | Bajgrowicz et al. | |
| 2005/0057428 A1 | 3/2005 | Fujita | |
| 2005/0060525 A1 | 3/2005 | Schwartz, Jr. et al. | |
| 2005/0066367 A1 | 3/2005 | Fyke et al. | |
| 2005/0071882 A1 | 3/2005 | Rodriguez et al. | |
| 2005/0118984 A1 | 6/2005 | Akiyama | |
| 2005/0138663 A1 | 6/2005 | Throckmorton et al. | |
| 2005/0184923 A1 | 8/2005 | Saito et al. | |
| 2005/0190777 A1 | 9/2005 | Hess et al. | |
| 2005/0193419 A1* | 9/2005 | Lindstrom et al. | 725/71 |
| 2005/0198673 A1 | 9/2005 | Kit | |
| 2005/0204388 A1 | 9/2005 | Knudson et al. | |
| 2005/0229206 A1 | 10/2005 | Pugel et al. | |
| 2005/0240969 A1 | 10/2005 | Sasaki et al. | |
| 2005/0264395 A1 | 12/2005 | Bassi | |
| 2005/0289605 A1 | 12/2005 | Jeon | |
| 2006/0018345 A1 | 1/2006 | Nadarajah et al. | |
| 2006/0030259 A1 | 2/2006 | Hetzel et al. | |
| 2006/0041912 A1 | 2/2006 | Kuhns | |
| 2006/0080707 A1 | 4/2006 | Laksono | |
| 2006/0133612 A1 | 6/2006 | Abedi et al. | |
| 2006/0174282 A1 | 8/2006 | Dennison et al. | |
| 2006/0225104 A1 | 10/2006 | James et al. | |
| 2006/0259929 A1 | 11/2006 | James | |
| 2006/0294512 A1 | 12/2006 | Seiden | |
| 2007/0083898 A1 | 4/2007 | Norin et al. | |
| 2007/0202800 A1 | 8/2007 | Roberts et al. | |
| 2008/0064355 A1 | 3/2008 | Sutskover et al. | |
| 2009/0013358 A1 | 1/2009 | Throckmorton et al. | |
| 2009/0150937 A1 | 6/2009 | Ellis et al. | |
| 2009/0252316 A1 | 10/2009 | Ratmanski et al. | |

FOREIGN PATENT DOCUMENTS

| | | |
|---|---|---|
| DE | 197 49 120 | 6/1999 |
| DE | 10155481 | 5/2003 |
| EP | 0 288 928 | 11/1988 |
| EP | 1207688 | 5/2002 |
| EP | 1331810 | 7/2003 |
| EP | 1447987 | 8/2004 |
| FR | 2861939 | 5/2005 |
| GB | 2 127 257 | 4/1984 |
| GB | 2354650 | 3/2001 |
| JP | 57193190 | 11/1982 |
| JP | 59-211380 | 11/1984 |
| JP | 60153225 | 8/1985 |
| JP | 60165832 | 8/1985 |
| JP | 61195094 | 8/1986 |
| JP | 61238130 | 10/1986 |
| JP | 62026933 | 2/1987 |
| JP | 62-279785 | 12/1987 |
| JP | 62279785 | 12/1987 |
| JP | 63016734 | 1/1988 |
| JP | 63059233 | 3/1988 |
| JP | 02054637 | 8/1988 |
| JP | 63202136 | 8/1988 |
| JP | 02140022 | 11/1988 |
| JP | 63309032 | 12/1988 |
| JP | 01-255389 | 10/1989 |
| JP | 01-256823 | 10/1989 |
| JP | 2140022 | 5/1990 |
| JP | 02209026 | 8/1990 |
| JP | 03058521 | 3/1991 |
| JP | 2001-231033 | 2/2000 |
| JP | 2001237752 | 8/2001 |
| JP | 2003339030 | 11/2003 |
| WO | WO 97/19554 | 5/1997 |
| WO | 0150290 | 7/2001 |
| WO | WO 01/56297 | 8/2001 |
| WO | 03026187 | 3/2003 |
| WO | WO 03094520 | 11/2003 |
| WO | 2004054128 | 6/2004 |
| WO | WO 2004/105283 | 12/2004 |
| WO | 2005094075 | 10/2005 |
| WO | WO 2005/114879 | 12/2005 |
| WO | 2006015186 | 2/2006 |
| WO | 2006017218 | 2/2006 |
| WO | WO 2006/026477 | 3/2006 |

OTHER PUBLICATIONS

International Search Report and Written Opinion dated Jan. 8, 2008 in counterpart International Application No. PCT/US06/12302 filed Apr. 3, 2006.

International Search Report and Written Opinion dated Feb. 12, 2008 in counterpart International Application No. PCT/US2006/012291 filed Apr. 3, 2006 of U.S. Appl. No. 11/097,723, filed Apr. 1, 2005.

Final Office Action dated Jan. 25, 2008 in U.S. Appl. No. 10/255,344, filed Sep. 25, 2002.

"Digital Satellite Equipment Control, Bus Functional Specification"; Bus Functional Specification; Eutelsat; Paris, France; Feb. 25, 1998; XP002348247; entire document.

Muller, Klaus; "DisEqC-controlled Sat-Installations"; RFE Radio Fernsehen Elektronik; Huss Medien GMBH; Berlin, Germany; vol. 46, No. 5; May 1997; pp. 42-44; XP000731482; (original German document and English translation).

Non-final Office Action date Oct. 3, 2008 in U.S. Appl. No. 11/097,723, filed Apr. 1, 2005 by Thomas H. James et al.

Non-final Office Action dated Oct. 1, 2008 in U.S. Appl. No. 11/097,482, filed Apr. 1, 2005 by Thomas H. James et al.

Non-final Office Action dated Sep. 4, 2008 in U.S. Appl. No. 11/097,479, filed Apr. 1, 2005 by Thomas H. James et al.

Mussino, F., "Reception and distribution techniques for DBS signals in community antenna installations," Accession No. 2781941, Alta Frequenza, 55(2):105-11, Mar.-Apr. 1986.

Mussino, F., "Evolution of the receiving and distribution installations of television signals: from terrestrial broadcasting to satellite broadcasting," Accession No. 2742699, Proc. Of the $32^{nd}$ Congress on Electronics: Satellite Broadcasting, 243-50, 1985—Abstract Only.

Mussino, F., "The reception of direct broadcast satellite TV signals in the 12 GHz band, using the C-MAC packet system," Accession No. 2325813, Elettronica e Telecomunicazioni, 33(3):117-30, May-Jun. 1984.

Mussino, F., "Centralized aerial systems [cable TV]," Accession No. 2306051, Radioindustria Elettronica—Televizione, 7(11):491-4, Nov. 1983—Abstract Only.

Chaplin, J.G., et al., "Satellite broadcast reception: the FM approach to signal distribution in individual and community antenna systems," Accession No. 2241798, EBU Review, Technical No. 202:274-81, Dec. 1983—Abstract Only.

Mussino, F., "Cabled distribution systems: wide-band and channelized reception methods," Accession No. 2207325, Elettronica e Telecomunicazoni, 32(5):229-33, Sep.-Oct. 1983—Abstract Only.

Mussino, F., "Intermodulation characteristics of the television broadcast satellite receivers," Accession No. 2095285, Alta Frequenza, 52(2):118-25, Mar.-Apr. 1983, Abstract Only.

Mussino, F., "Some problems of television reception," Accession No. 1850235, Elettronica e Telecomunicazioni, 30(4):165-70, Jul.-Aug. 1981, Abstract Only.

Bava, G. et al., "Characteristics and structure of receivers for direct TV radiodiffusion by satellite in the 12 GHz band," Accession No. 1512676, Alta Frequenza, 48(12):714-25, Dec. 1979, Abstract Only.

Mussino, F., "Synchronous demodulator for television signals," Accession No. 1497282, Elettronica e Telecomunicazioni, 28(3):101-7, May-Jun. 1979, Abstract Only.

Mussino, F., "Windscreen antenna," Accession No. 1315746, Alta Frequenza, 47(10):720-7, Oct. 1978, Abstract Only.

Mussino, F., "Characteristics and problems with centralised antennae," Accession No. 1290455, Radioindustria Elettronica—Televizione 4:203-8, Apr. 1978, Abstract Only.

Mussino, F., "EMC measurements on the electrical equipment of cars," Accession No. 1117953, $2^{nd}$ symposium and technical exhibition on electromagnetic compatibility, 131-3, 1977, Abstract Only.

Mussino, F., "RF impedance of the electrical network of cars," Accession No. 1000748, International Symposium on Electromagnetic Compatibility, 418-23, 1976, Abstract Only.

Beccari, C. et al, "All-pass networks with constant phase difference," Accession No. 980800, Elettronica e Telecomunicazioni, 25(3):117-22, May-Jun. 1976, Abstract Only.

Mussino, F., "Measuring methods for CATV systems proposed by IEC," Accession No. 945815, Elettronica e Telecomunicazioni, 25(1):29-34, Jan.-Feb. 1976, Abstract Only.

Mussino, F., "Characteristics of CATV systems proposed by IEC," Accession No. 909134, Elettronica e Telecomunicazioni, 24(6):243-5, Nov.-Dec. 1975, Abstract Only.

Mussino, F., "Antenna amplifier for field strength measurements on wide frequency band," Accession No. 544273, Elettronica e Telecomunicazioni, 22(2):49-52, Mar.-Apr. 1973, Abstract Only.

Mussino, F., "FM receiver with coherent demodulation," Accession No. 320402, Elettronica e Telecomunicazioni, 20(4):133-7, 1971, Abstract Only.

Mussino, F., "Coherent detection receivers for radio and television broadcasting," Accession No. 273689, Elettronica e Telecomunicazioni, 20(2):57-69, Mar.-Apr., 1971, Abstract Only.

Mussino, F. et al., "Stereophonic transmission system using double carrier modulation," Accession No. 208381, Proceedings of the $17^{th}$ international congress on electronics, 415-21, 1970, Abstract Only.

Mussino, F., "A means of continuously varying phase," Accession No. 89438, Elettronica e Telecomunicazioni, 18(4):118-24, Jul. 1969, Abstract Only.

Carrillo, J.A. et al., "Stereophonic reception noise figure of 'pilot frequency' systems," Accession No. 22497, Elettronica e Telecomunicazioni, 17(5):162-6, Sep. 1968, Abstract Only.

Di Zenobio, D. et al., "A switching circuit scheme for a satellite site diversity system," Accession No. 3316999, 1988 IEEE International Symposium on Circuits and Systems. Proceedings (Cat. No. 88CH2458-8), 1:119-22, Abstract Only.

Holtstiege, H., "Satellite reception-tips and tricks of an expert," Accession No. 3132408, Funkschau, 4:57-8, 61-2, Feb. 12, 1988, Abstract Only.

Cominetti, M. et al., "Distribution of DBS signals of the MAC-family in collective antenna systems," Accession No. 3117800, New Systems and Services in Telecommunications, III: Networks, Cables, Satellites—The What, the How, the Why? Proceedings of the Third International Conference: 417-25, 1987, Abstract Only.

O'Neill, H.J. et al., "The distribution of C-MAC in cable systems," Accession No. 2856976, Cable Television Engineering, 13(7):294-301, Dec. 1986, Abstract Only.

Lowell, R.R. et al., "NASA's communication program examined for the 1980s and 1990s. I," Accession No. 2801869, MSN Microwave Systems News & Communications Technology, 16(9):79-81, 83-5, 87-8, 90, Aug. 1986, Abstract Only.

Kudsia, C.M. et al., "RF channel characteristics and enhanced performance in future DBS satellites at 12 GHz in Region 2," Accession No. 2759373, AIAA $11^{th}$ Communication Satellite Systems Conference. Collection of Technical Papers: 220-4, 1986, Abstract Only.

Baker, S., "Eutelsat in the 90s," Accession No. 2569799, Cable & Satellite Europe, 7:9-12, Jul. 1985, Abstract Only.

Hessenmuller, H., "The progress towards a unified colour television standard for satellite broadcasting in Europe," Accession No. 2569494, Fernmelde-Ingenieur, 39(8):1-36, Aug. 1985, Abstract Only.

Sultan, N. et al., "Reconfigurable dual feed antenna for direct broadcast satellites," Accession No. 2496781, Acta Astronautica, 12(1):27-35, Jan. 1985, Abstract Only.

Gandy, C., "Antenna requirements and design options for DBS domestic reception," Accession No. 2358182, IBC 84. International Broadcasting Convention (Proceedings No. 240): 251-3, 1984, Abstract Only.

Renton, C., "RCA satcom Ku-band antenna system," Accession No. 2867860, AP-S International Symposium 1986. 1986 International Symposium Digest Antennas and Propagation (Cat. No. 86CH2325-9) 1:157-60, 1986, Abstract Only.

Sultan, N. et al., "A reconfigurable multiple shaped beam reflector antenna for direct broadcast satellite," Accession No. 2079246, Third International Conference on Antennas and Propagation ICAP 83: 203-7, pt. 1, 1983, Abstract Only.

Palumbo, B., "Dual polarized two-frequence slot array for a satellite electronically despun antenna," Accession No. 184451, 1969 European microwave conference: 147, 1970, Abstract Only.

Lenormand, R. et al., "CAD for HERMES antennas," Accession No. 3317368, AP-S Intenational Symposium 1988. 1988 International Symposium Digest Antennas and Propagation (Cat. No. 88CH2563-5): 1:26-9, 1988, Abstract Only.

Naderi, F.M., "ACTS: the first step toward a switchboard in the sky," Accession No. 3190134, Telematics and Informatics, 5(1):13-20, 1988, Abstract Only.

Noda, H. et al., "Satellite TV receiving system," Accession No. 3152051, JRC Review, 26:45-50, 1988, Abstract Only.

Binder, R. et al., "The multiple satellite system-low altitude survivable communications," Accession No. 3095999, MILCOM 87: 1987 IEEE Military Communications Conference. 'Crisis Communications: The Promise and Reality'. Conference Record (Cat. No. 87CH2493-5), 2:620-5, 1987, Abstract Only.

Hori, T. et al., "Electronically steerable spherical array antenna for mobile earth station," Accession No. 2935203, Fifth International Conference on Antennas and Propagation (ICAP 87) (Conf. Publ. No. 274), 1:55-8, 1987, Abstract Only.

Yamamoto, H. et al., "Communications equipment for multibeam satellites," Accession No. 2727289, Telecommunication technologies 1985/1986: 109-18, 1985, Abstract Only.

Thurl, W. et al., "Satellite receiving station for TV programme distribution," Accession No. 2480868, Mikrowellen Magazin, 10(6):604-6, Dec. 1984, Abstract Only.

Alaria, G.B. et al., "SS/TDMA satellie system with on board TST switching stage," Accession No. 2342421, CSELT Rapporti Tecnici, 12(3):247-55, Jun. 1984, Abstract Only.

Kudrna, K., "Preliminary test results of the electronic switching spherical array antenna," Accession No. 2324225, ITC/USA/'83. International Telemetering Conference: 11-17, 1983, Abstract Only.

Vidal Saint-Andre, B. et al., "A multi-element primary feed system and associated switch device designed for TDMA communication satellites," Accession No. 2290842, Annales des Telecommunications, 39(1-2):76-83, Jan.-Feb. 1984, Abstract Only.

Bongiovanni, G., et al., "Optimal switching algorithm for multibeam satellite systems with variable bandwidth beams," Accession No. 2258153, IBM Technical Disclosure Bulletin, 26(8):4344-8, Jan. 1984, Abstract Only.

Saint-Andre, B.V., et al., "A multi-element primary feed system and associated switch device designed for TDMA communication satellites," Accession No. 2257271, GLOBECOM '83 IEEE Global Telecommunications Conference. Conference Record: 3:1645-9, 1983, Abstract Only.

Spisz, E.W., "NASA development of a satellite switched SS-TDMA IF switch matrix," Accession No. 2241614, CECON '83 Record: Cleveland Electrical/Electronics Conference and Exposition 1983: 19-27, Nov. 1983, Abstract Only.

Kudrna, K. et al., "The Electronica Switching Spherical Array (ESSA) antenna for the Earth Radiation Budget Spacecraft (ERBS)," Accession No. 2148187, ITC/USA/'82. International Telemetering Conference, 271-88, 1982, Abstract Only.

Kumagai, H. et al., "20 GHz band receiving facilities at sub-earth-station for CS site diversity switching experiments," Accession No. 2147104, Review of the Radio Research Laboratories, 28(147):553-60, Sep. 1982, Abstract Only.

Kennedy, W.A., "UHE airborne satcom antenna systems," Accession No. 2111199, Midcon/80 Conference Record: 8/1/1-6, 1980, Abstract Only.

Grant, I. et al., "The SKYSWITCH project," Accession No. 2111056, Telecommunications, 17(1):80, 88, Jan. 1983, Abstract Only.

King-tim, Ko et al., "A space-division multiple-access protocol for spot-beam antenna and satellite-switched communication network," Accession No. 2079577, IEEE Journal on Selected Areas in Communications, vol. SAC-1, No. 1:126-32, Jan. 1983, Abstract Only.

Farrell, P.G., "Modulation and coding," Accession No. 2464817, International Journal of Satellite Communications, 2(4):287-304, Oct.-Dec. 1984, Abstract Only.

Beach, M.A. et al., "An adaptive antenna array for future land mobile satellite terminals," Accession No. 3416971, Sixth International Conference on Antennas and Propagation (ICAP 89) (Conf. Publ. No. 301), 1:326-30, 1989, Abstract Only.

Johannsen, K.G., "Ground station tracking of dual linearly polarized satellites," Accession No. 922037, IEEE Transactions on Aerospace and Electronic Systems, vol. AED-11, No. 6: 1333-45, Nov. 1975, Abstract Only.

Harvey, R.V., "Simplifying the planning of frequency assignments for satellite broadcasting," Accession No. 1069917, EBU Review, Technical 159:218-26, Oct. 1976, Abstract Only.

Nakagawa, M., "Satellite broadcasting in Japan," Accession No. 3473565, AEU 3:50-3, 1989, Abstract Only.

Vuong, X.T. et al., "Some practical strategies for reducing intermodulation in satellite communications," Accession No. 3401833, IEEE Transactions on Aerospace and Electronica Systems, 24(6):755-65, Nov. 1988, Abstract Only.

Poulton, G.T. et al., "Earth-station antennas for multiple satellite access," Accession No. 3352237, Journal of Electrical and Electronics Engineering, Australia, 8(3):168-76, Sep. 1988, Abstract Only.

Alper, A.T., "Capacity allocation in a multi-transponder communications satellite with a common reconfigurable multiple-beam antenna," Accession No. 1790796, IEEE 1981 International Conference on Communications, 54.5/1-5, vol. 3, 1981, Abstract Only.

Matsushita, M. et al., "Some considerations on achieving optimum receiving systems for satellite broadcasting," Accession No. 306770, Proceedings of the 8$^{th}$ international symposium on space technology and science, 719-25, 1969, Abstract Only.

Lewis, V., "SMATV-Phase 1-updating MATV systems (UK)," Electronic Technology 23(1):10-15, Jan. 1989, Accession No. 3392948, Abstract Only.

Keen, K.M. et al., "Techniques for the measurement of the cross-polarisation radiation patterns of linearly polarised, polarisation-diversity satellite ground-station antennas," Accession No. 1933335, IEE Proceedings H (Microwaves, Optics and Antennas) 129(3):103-8, Jun. 1982, Abstract Only.

DiFonzo, D.F., "Antennas: Key to communications satellite growth," Accession No. 1279523, Microwave Systems News 8(6):83-5, 87, 90-1, Jun. 1, 1978, Abstract Only.

Dement, D.K., "NASA's revitalized role in satellite communications," Accession No. 1527953, IEEE Communications Magazine, 18(1):37-41, Jan. 1980, Abstract Only.

Kalliomaki, K. et al., "Electronically tracking antenna system for satellite reception," Accession No. 150587, IEEE Transactions on Aerospace and Electronic Systems, vol. AES-6, No. 3:405-7, May 1970, Abstract Only.

Inoue, T. et al., "30/20 GHz band SCPC satellite communication using small earth stations," Accession No. 2191343, IEEE Journal on Selected Areas in Communications, vol.SAC-1, No. 4:600-8, Sep. 1983, Abstract Only.

Jacobs, I.M. et al., "Trends in military satellite communication networks," Accession No. 1611408, AIAA 8$^{th}$ Communications Satellite Systems Conference 762-5, 1980, Abstract Only.

Davies, R. et al., "Packet communications in satellites with multiple-beam antennas and signal processing," Accession No. 1611382, AIAA 8$^{th}$ Communications Satellite Systems Conference, 378-85, 1980, Abstract Only.

Raymond, H.G. et al., "An advanced mixed user domestic satellite system architecture," Accession No. 1611364, AIAA 8$^{th}$ Communications Satellite Systems Conference, 148-53, 1980, Abstract Only.

Pennoni, G. et al., "An SS-TDMA satellite system incorporating an onboard time/space/time switching facility: overall system characteristics and equipment description," Links for the Future. Science, Systems & Services for Communications. Proceedings of the International Conference on Communications-ICC 84, 2:800-6, 1984, Abstract Only.

Greborio, G.B., "Direct Satellite Television: Distribution System for New Centralised Antenna Installations," Electronics and Telecommunications, 6:271-284, 1984.

Chaplin, J.G. et al., "Satellite broadcast reception: the FM approach to signal distribution in individual and community antenna systems," EBU Review, Technical No. 202, Dec. 1983, 11 pgs.

Sharifi, M.H. et al., "A Multiple Access Technique for Centralized Multiple Satellite Networking with On-Board Processing in the Central Node," IEEE, 1012-1021, 1988.

Schmidt, R.L. et al., "Transmission of Two NTSC Color Television Signals Over a Single Satellite Transponder Via Time-Frequency Multiplexing," IEEE Transactions on Communications, vol. Com-31, 11:1257-1266, Nov. 1983.

Pfund, E.T., "Direct Television Broadcasting with a Medium-Size Satellite," IEEE, 121-129, 1988.

Lee, L.-S., "A Polarization Control System for Satellite Communications with Multiple Uplinks," IEEE Transactions on Communications, vol. Com-26, No. 8, 1201-1211, Aug. 1978.

Naderi, F.M., "Advance Satellite Concepts for Future Generation VSAT Networks," IEEE Communications Magazine, 13-22, Sep. 1988.

Granlund, J. et al., "Diversity Combining for Signals of Different Medians," IRE Transactions on Communications Systems, 138-145, 1961.

Davies, P.G. et al., "Measurements of SIRIO Transmissions near 11.6 GHz at Slough (UK)," Alta Frequenza, 332-158 E-338-164 E, 1979.

Chakraborty, D., "Survivable Communication Concept Via Multiple Low Earth-Orbiting Satellites," IEEE Transactions on Aerospace and Electronic Systems, 25(6):879-889, Nov. 1989.

Buntschuh, R.F., "First-Generation RCA Direct Broadcast Satellites," IEEE Journal on Selected Areas in Communications, vol. SAC-3, No. 1, 126-134, Jan. 1985.

Bridle, M., "Satellite Broadcasting in Australia," IEEE Transactions on Broadcasting, vol. 34, No. 4, 425-429, Dec. 1988.

Bertossi, A.A. et al., "Time Slot Assignment in SS/TDMA Systems with Intersatellite Links," IEEE Transactions on Communications, vol. Com-35, No. 6, 602-608, Jun. 1987.

Stephens, G.M., "European DBS: On the Brink," Satellite Communications, Jul. 1988.

Weinberg, A., "On the Passage of High-Level Pulsed Radio Frequency Interference Through a Nonlinear Satellite Transponder," IEEE Transactions on Communications, vol. Com-32, No. 1, 13-24, Jan. 1984.

Tasaka, S., "The SRUC Protocol for Satellite Packet Communication—A Performance Analysis," IEEE Transactions on Communications, vol. Com-34, No. 9, 937-945, Sep. 1986.

Seth, A.K., "Satellite Communication Experiments in the Country," J. Instn. Electronics & Telecom. Engrs., 28(5):199-207, 1982.

Saleh, A.A.M. et al., "Distributed Antennas for Indoor Radio Communications," IEEE Transactions on Communications, vol. Com-35, No. 12, 1245-1251, Dec. 1987.

Jeruchim, M.C., "On the Application of Importance Sampling to the Simulation of Digital Satellite and Multihop Links," IEEE Transactions on Communications, vol. Com-32, No. 10, 1088-1104, Oct. 1984.

Kavehrad, M., "Direct-Sequence Spread Spectrum with DPSK Modulation and Diversity for Indoor Wireless Communications," IEEE Transactions on Communications, vol. Com-35, No. 2, 224-241, Feb. 1987.

Mosely, J. et al., "A Class of Efficient Contention Resolution Algorithms for Multiple Access Channels," IEEE Transactions on Communications, vol. Com-33, No. 2, 145-151, Feb. 1985.

Jain, C.L. et al., "A Direct Reception System for Time Synchronization Via InSat-1," J. Instn. Electronics & Teleom. Engrs, 27(10):470-476, 1981.

Gopal, I.S., et al., "Scheduling in Multibeam Satellites with Interfering Zones," IEEE Transactions on Communications, vol. Com-31, No. 8, 941-951, Aug. 1983.

Gopal, I.S. et al., "Point-to-Multipoint Communication Over Broadcast Links," IEEE Transactions on Communications, vol. Com-32, No. 9, 1034-1049, Sep. 1984.

Gole, P. et al., "Effect of Ice-Induced Cross-Polarization on Digital Earth-Space Links," IEEE Transactions on Communications, vol. Com-32, No. 1, 70-81, Jan. 1984.

Jacobs, I.M. et al., "Trends in Military Satellite Communication Networks," American Institute of Aeronautics and Astronautics, Inc., 762-765, 1980.

Glance, B. et al., "Frequency-Selective Fading Effects in Digital Mobile Radio with Diversity Combining," IEEE Transactions on Communications, vol. Com-31, No. 9, 1085-1094, Sep. 1983.

Cox, D.C., "Antenna Diversity Performance in Mitigating the Effects of Portable Radiotelephone Orientation and Multipath Propagation," IEEE Transactions on Communications, vol. Com-31, No. 5, 620-628, May 1983.

Cimini, Jr., L.J., "Analysis and Simulation of a Digital Mobile Channel Using Orthogonal Frequency Division Multiplexing," IEEE Transactions on Communications, vol. Com-33, No. 7, 665-675, Jul. 1985.

Cartledge, J.C., "Outage Performance of QAM Digital Radio Using Adaptive Equalization and Switched Space Diversity Reception," IEEE Transactions on Communications, vol. Com-35, No. 2, 166-180, 1987.

Kudsia, C.M., et al., "RF channel characteristics and enhanced performance in future DBS satellites at 12 GHz in Region 2," AIAA 11$^{th}$ Communication Satellite Systems Conference. Collection of Technical Papers: 220-4, 1986, Accession No. 2759373 (Abstract).

Binder, R. et al., "Crosslink architectures for a multiple satellite system," Proceedings of the IEEE, vol. 75, No. 1: 74-82, Jan. 1987, Accession No. 2883355 (Abstract).

Dubrovnik, International Telecommunication Union, Recommendations and Reports of the CCIR, 1986, CCIR Report 473-4, pp. 190-211 (see 198-200, 204)—XVIth Plenary Assembly, 1986—vols. X and XI—Part 2, Broadcasting Satellite Service (Sound and Television).

Final Office Action dated Aug. 5, 2008 in U.S. Appl. No. 10/123,383, filed Apr. 15, 2002 by Robert Davis et al.

Non-final Office Action dated Jun. 12, 2008 in U.S. Appl. No. 10/255,344, filed Sep. 25, 2002 by Thomas H. James et al.

Non-final Office Action dated Jun. 27, 2008 in U.S. Appl. No. 11/219,247, filed Sep. 2, 2005 by Thomas H. James et al.

Non-final Office Action dated Jun. 27, 2008 in U.S. Appl. No. 11/219,407, filed Sep. 2, 2005 by Thomas H. James et al.

Non-final Office Action dated Feb. 22, 2008 in U.S. Appl. No. 10/123,383, filed Apr. 15, 2002 by Robert Davis et al.

EPO Communication dated Sep. 22, 2008 in European Application No. 06802627.7 filed Aug. 30, 2006 by Thomas James et al.

Non-final Office Action dated Oct. 9, 2008 in U.S. Appl. No. 11/097,724, filed Apr. 1, 2005 by Thomas James et al.

Non-final Office Action dated Feb. 24, 2009 in U.S. Appl. No. 11/097,479, filed Apr. 1, 2005 by Thomas H. James et al.

Final Rejection dated Apr. 1, 2009 in U.S. Appl. No. 11/097,625, filed Apr. 1, 2005 by Thomas H. James et al.

Final Rejection dated Apr. 1, 2009 in U.S. Appl. No. 11/097,724, filed Apr. 1, 2005 by Thomas H. James et al.

Final Rejection dated Mar. 31, 2009 in U.S. Appl. No. 11/097,481, filed Apr. 1, 2005 by Thomas H. James et al.

Final Rejection dated Apr. 6, 2009 in U.S. Appl. No. 11/097,615, filed Apr. 1, 2005 by Thomas H. James et al.

Non-final Office Action dated Nov. 13, 2008 in U.S. Appl. No. 10/123,383, filed Apr. 15, 2002 by Robert Davis et al.

Final Rejection dated Mar. 13, 2009 in U.S. Appl. No. 11/097,482, filed Apr. 1, 2005 by Thomas H. James et al.

Final Rejection dated Mar. 18, 2009 in U.S. Appl. No. 11/097,723, filed Apr. 1, 2005 by Thomas H. James et al.

Non-final Office Action dated Dec. 23, 2008 in U.S. Appl. No. 11/219,247, filed Sep. 2, 2005 by Thomas James et al.

Non-final Office Action dated Dec. 24, 2008 in U.S. Appl. No. 11/219,407, filed Sep. 2, 2005 by Thomas James et al.

Final Rejection dated Jan. 6, 2009 in U.S. Appl. No. 10/255,344 filed Sep. 25, 2002 by Thomas James et al.

Non-final Office Action dated Oct. 15, 2008 in U.S. Appl. No. 11/097,615, filed Apr. 1, 2005 by Thomas H. James et al.

Non-final Office Action dated Oct. 27, 2008 in U.S. Appl. No. 11/097,481, filed Apr. 1, 2005 by Thomas H. James et al.

Non-final Office Action dated Oct. 28, 2008 in U.S. Appl. No. 11/097,625, filed Apr. 1, 2005 by Thomas H. James et al.

Final Rejection dated May 27, 2009 in U.S. Appl. No. 10/123,383, filed Apr. 15, 2002 by Robert Davis et al.

Non-final Office Action dated Jun. 10, 2009 in U.S. Appl. No. 10/255,344, filed Sep. 25, 2002 by Thomas H. James et al.

Final Rejection dated Jul. 1, 2009 in U.S. Appl. No. 11/219,407, filed Sep. 2, 2005 by Thomas H. James et al.

Non-final Office Action dated Jun. 26, 2009 in U.S. Appl. No. 11/219,418, filed Sep. 2, 2005 by Thomas H. James et al.

Final Rejection dated Jul. 28, 2009 in U.S. Appl. No. 11/219,247, filed Sep. 2, 2005 by Thomas H. James et al.

Non-final Office Action dated Aug. 17, 2009 in U.S. Appl. No. 11/097,615 filed Apr. 1, 2005 by Thomas H. James et al.

Non-final Office Action dated Aug. 19, 2009 in U.S. Appl. No. 11/097,482, filed Apr. 1, 2005 by Thomas H. James et al.

Final Rejection dated Aug. 20, 2009 in U.S. Appl. No. 11/097,479, filed Apr. 1, 2005 by Thomas H. James et al.

Non-final Office Action dated Aug. 20, 2009 in U.S. Appl. No. 11/097,723, filed Apr. 1, 2005 by Thomas H. James et al.

Non-final Office Action dated Sep. 28, 2009 in U.S. Appl. No. 11/097,625, filed Apr. 1, 2005 by Thomas H. James et al.

Final Rejection dated Dec. 18, 2009 in U.S. Appl. No. 10/255,344, filed Sep. 25, 2002 by Thomas H. James et al.

Final Rejection dated Dec. 24, 2009 in U.S. Appl. No. 11/219,418, filed Sep. 2, 2005 by Thomas H. James et al.

Non-final Office action dated Dec. 23, 2009 in U.S. Appl. No. 11/219,247, filed Sep. 2, 2005 by Thomas H. James et al.

Non-final Office action dated Dec. 23, 2009 in U.S. Appl. No. 11/219,407, filed Sep. 2, 2005 by Thomas H. James et al.

Non-final Office action dated Dec. 22, 2009 in U.S. Appl. No. 11/097,479, filed Apr. 1, 2005 by Thomas H. James et al.

Final Rejection dated Mar. 1, 2010 in U.S. Appl. No. 11/097,723, filed Apr. 1, 2005 by Thomas H. James et al.

Final Rejection dated Mar. 2, 2010 in U.S. Appl. No. 11/097,482, filed Apr. 1, 2005 by Thomas H. James et al.

Extended European search report dated Mar. 4, 2010 in European Patent Application No. 06749157.1 filed Mar. 3, 2006 by Thomas H. James et al.

Extended European search report dated Mar. 4, 2010 in European Patent Application No. 06749162.1 filed Apr. 3, 2006 by Thomas H. James et al.

Extended European search report dated Mar. 4, 2010 in European Patent Application No. 06749163.9 filed Apr. 3, 2006 by Thomas H. James et al.

Extended European search report dated Mar. 4, 2010 in European Patent Application No. 0674918.9 filed Apr. 3, 2006 by Thomas H. James et al.

Extended European search report dated Mar. 4, 2010 in European Divisional Patent Application No. 09075217.1 filed Apr. 3, 2006 (parent filing date of European Patent Application No. 06749157.1) by Thomas H. James et al.

International Search Report and Written Opinion dated Apr. 23, 2010 in International Application No. PCT/US2010/020246 filed Jan. 6, 2010 by Robert F. Popoli.

Final Rejection dated Apr. 8, 2010 in U.S. Appl. No. 11/810,774, filed Jun. 7, 2007 by Hanno Basse et al.

Non-final Office action dated Oct. 16, 2009 in U.S. Appl. No. 11/810,774, filed Jun. 7, 2007 by Hanno Basse et al.

International Search Report and Written Opinion dated Dec. 30, 2008 in International Application No. PCT/US2007/013418 filed Jun. 7, 2007 by Hanno Basse et al.

International Search Report and Written Opinion dated Dec. 30, 2008 in International Application No. PCT/US2007/014234 filed Jun. 19, 2007 by Thomas H. James et al.

Final Rejection dated Apr. 26, 2010 in U.S. Appl. No. 11/820,205, filed Jun. 18, 2007 by Hanno Basse et al.

EPO Communication dated Feb. 4, 2010 in European Patent Application No. 07809643.5 filed Jun. 18, 2007 by Hanno Basse et al.

Non-final Office action dated Oct. 26, 2009 in U.S. Appl. No. 11/820,205, filed Jun. 18, 2007 by Hanno Basse et al.

EPO Communication dated Mar. 23, 2010 in European Patent Application No. 08767915.5 filed May 28, 2008 by John L. Norin.

International Search Report and Written Opinion dated Dec. 18, 2008 in International Application No. PCT/US2008/006750 filed May 28, 2008 by John L. Norin.

Final Rejection dated Apr. 1, 2010 in U.S. Appl. No. 11/097,625, filed Apr. 1, 2005 by Thomas H. James et al.

Final Rejection dated Mar. 29, 2010 in U.S. Appl. No. 11/097,615, filed Apr. 1, 2005 by Thomas H. James et al.

Non-final Office action dated Jun. 21, 2010 in U.S. Appl. No. 11/219,418, filed Sep. 2, 2005 by Thomas H. James et al.
Final Rejection dated Jun. 21, 2010 in U.S. Appl. No. 11/219,247, filed Sep. 2, 2005 by Thomas H. James et al.
Non-final Office action dated Jun. 23, 2010 in U.S. Appl. No. 11/820,446, filed Jun. 19, 2007 by Thomas H. James et al.
Notice of Allowance dated Sep. 16, 2010 in U.S. Appl. No. 11/097,625, filed Apr. 1, 2005 by Thomas H. James et al.
Non-final Office action dated Aug. 31, 2010 in U.S. Appl. No. 11/097,615, filed Apr. 1, 2005 by Thomas H. James et al.
EPO supplementary search report and search opinion dated Aug. 19, 2010 in European Patent Application No. 06749155.5 filed Apr. 3, 2006 by Thomas H. James et al.
STMicroelectronics; "Extension of the DiseqC 1 Standard for Control of Satellite Channel Router Based One-Cable LNBs"; Application Note; Oct. 5, 2004; pp. 1-12; XP00239973.
Notice of Allowance dated Dec. 6, 2010 in U.S. Appl. No. 11/097,479 filed Apr. 1, 2005 by Thomas H. James et al.
EPO supplementary search report and search opinion dated Aug. 19, 2010 in European Patent Application No. 06740394.9 filed Apr. 3, 2006 by Thomas H. James et al.
EPO supplementary search report and search opinion dated Aug. 16, 2010 in European Patent Application No. 06749160.5 filed Apr. 3, 2006 by Thomas H. James et al.
Final Rejection dated Jan. 12, 2011 in U.S. Appl. No. 11/810,774, filed Jun. 7, 2007 by Hanno Basse et al.
Final Rejection dated Jan. 18, 2011 in U.S. Appl. No. 11/097,482, filed Apr. 1, 2005 by Thomas H. James et al.
Notice of Allowance dated Jan. 20, 2011 in U.S. Appl. No. 10/255,344, filed Sep. 25, 2002 by Thomas H. James et al.
Notice of Allowance dated Dec. 23, 2010 in U.S. Appl. No. 11/219,418 filed Sep. 2, 2005 by Thomas H. James et al.
Mexican Office action dated Jul. 26, 2010 in Mexican Patent Application No. MX/a/2008/015659 filed Jun. 18, 2007 by Hanno Basse et al.
Chinese Office action dated Jun. 23, 2010 in Chinese Patent Application No. 200780029062.3 filed Jun. 7, 2007 by Hanno Basse et al.
Non-final Office action dated Jul. 20, 2010 in U.S. Appl. No. 11/810,774, filed Jun. 7, 2007 by Hanno Basse et al.
EPO Communication dated Jun. 25, 2010 in European Patent Application No. 07815055.4 filed Jun. 7, 2007 by Hanno Basse et al.
European Telecommunications Satellite Organization (EUTELSAT); "Digital Satellite Equipment Control (DiSEqC): Application Information for Tuner-Receivers/IRDS"; Apr. 12, 1996; pp. 1-25.
Final Rejection dated Jul. 7, 2010 in U.S. Appl. No. 11/097,479, filed Apr. 1, 2005 by Thomas H. James et al.
Non-final Office action dated Jul. 20, 2010 in U.S. Appl. No. 11/097,482, filed Apr. 1, 2005 by Thomas H. James et al.
Non-final Office Action dated Aug. 13, 2010 in U.S. Appl. No. 11/820,205, filed Jun. 18, 2007 by Hanno Basse et al.
Non-final Office action dated Jul. 20, 2010 in U.S. Appl. No. 10/255,344, filed Sep. 25, 2002 by Thomas H. James et al.
Supplementary European search report dated Jul. 6, 2010 in European Patent Application No. 06749159.7 filed Apr. 3, 2006 by Thomas H. James et al.
Final Rejection dated Jul. 21, 2010 in U.S. Appl. No. 11/219,407, filed Sep. 2, 2005 by Thomas H. James et al.
Notice of Allowance dated Aug. 16, 2010 in U.S. Appl. No. 11/097,723, filed Apr. 1, 2005 by Thomas H. James et al.
Final Rejection dated Jan. 31, 2011 in U.S. Appl. No. 11/820,205 filed Jun. 18, 2007 by Hanno Basse et al.
Non-final Office action dated Feb. 18, 2011 in U.S. Appl. No. 12/195,256 filed Aug. 20, 2008 by Robert F. Popoli.
Notice of Allowance dated Jan. 10, 2011 in U.S. Appl. No. 11/097,479 filed Apr. 1, 2005 by Thomas H. James et al.
Notice of Allowance dated Jan. 20, 2011 in U.S. Appl. No. 10/255,344 filed Sep. 25, 2002 by Thomas H. James et al.
Notice of Allowance dated Feb. 17, 2011 in U.S. Appl. No. 11/097,615 filed Apr. 1, 2005 by Thomas H. James et al.
Notice of Allowance dated Dec. 23, 2010 in U.S. Appl. No. 11/219,418 filed Sep. 2, 2005 by Thomas H. James et al.
Final Rejection dated Jan. 18, 2011 in U.S. Appl. No. 11/097,482 filed Apr. 1, 2005 by Thomas H. James et al.
Final Rejection dated Jan. 12, 2011 in U.S. Appl. No. 11/810,774 filed Jun. 7, 2007 by Hanno Basse et al.
Non-final Office action dated Mar. 15, 2011 in U.S. Appl. No. 11/820,446 filed Jun. 19, 2007 by Thomas H. James et al.

* cited by examiner

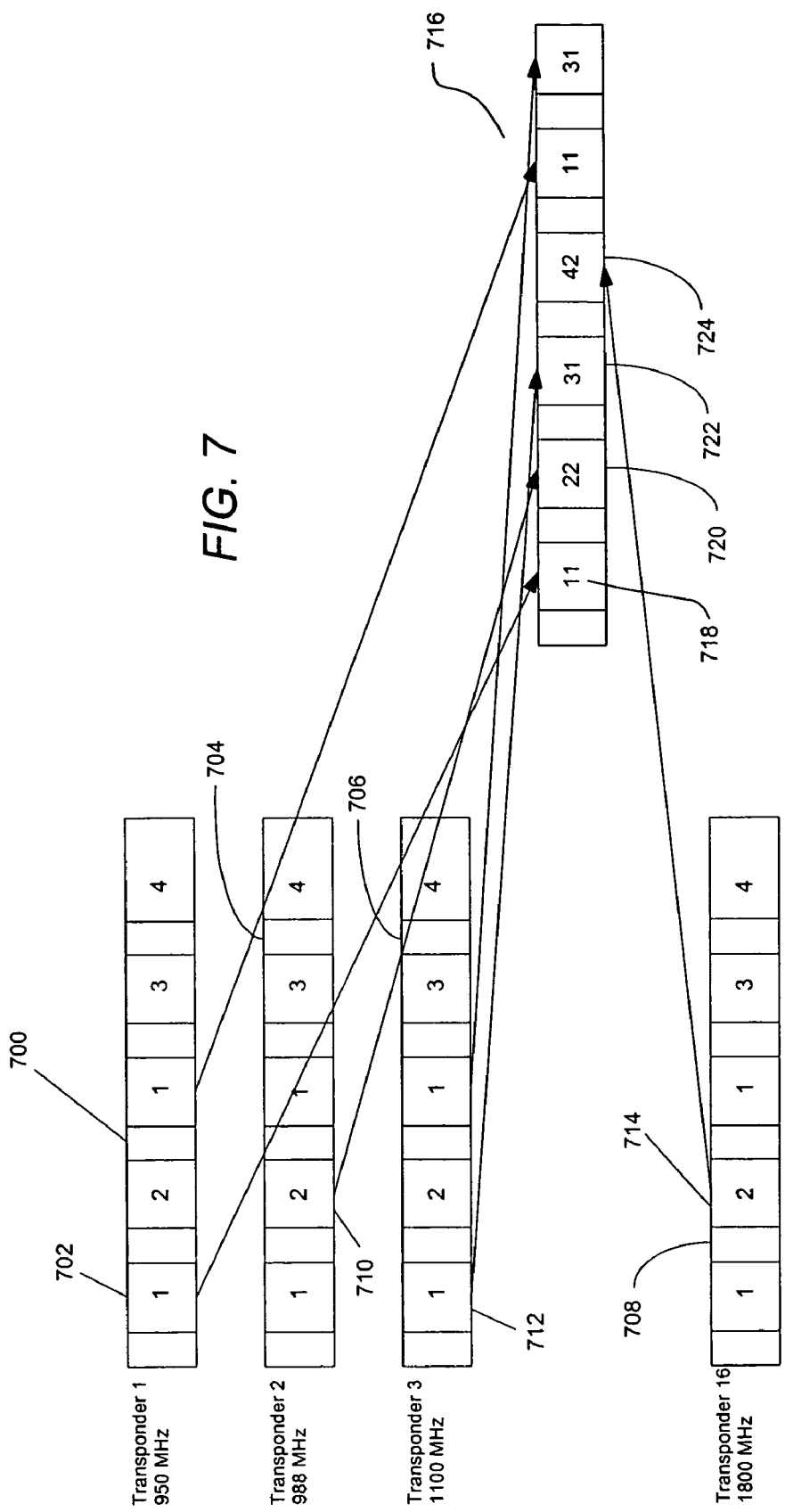

AUTOMATIC LEVEL CONTROL FOR INCOMING SIGNALS OF DIFFERENT SIGNAL STRENGTHS

CROSS-REFERENCE TO RELATED APPLICATIONS

This application is related to the following co-pending and commonly-assigned applications:

application Ser. No. 11/097,615, filed on same date herewith, by Thomas H. James and Dipak M. Shah, entitled "SYSTEM ARCHITECTURE FOR CONTROL AND SIGNAL DISTRIBUTION ON COAXIAL CABLE,";

application Ser. No. 11/097,482, filed on same date herewith, by Thomas H. James and Dipak M. Shah, entitled "BACKWARDS-COMPATIBLE FREQUENCY TRANSLATION MODULE FOR SATELLITE VIDEO DELIVERY,";

application Ser. No. 11/097,479, filed on same date herewith, by Thomas H. James and Dipak M. Shah, entitled "TRANSPONDER TUNING AND MAPPING,";

application Ser. No. 11/097,724, filed on same date herewith, by Thomas H. James and Dipak M. Shah, entitled "POWER BALANCING SIGNAL COMBINER,";

application Ser. No. 11/097,481, filed on same date herewith, by Thomas H. James and Dipak M. Shah, entitled "SIGNAL INJECTION VIA POWER SUPPLY,";

application Ser. No. 11/097,625, filed on same date herewith, by Thomas H. James and Dipak M. Shah, entitled "NARROW-BANDWIDTH SIGNAL DELIVERY SYSTEM,"; and application Ser. No. 11/097,723, filed on same date herewith, by Thomas H. James and Dipak M. Shah, entitled "INTELLIGENT TWO-WAY SIGNAL SWITCHING NETWORK,";

all of which applications are incorporated by reference herein.

BACKGROUND OF THE INVENTION

1. Field of the Invention

The present invention relates generally to a satellite receiver system, and in particular, to an automatic level control system for incoming signals of different signal strengths.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 1840 GHz, but typically 20-30 GHz.

FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 128 can only receive one polarization at time, so by aligning polarizations between the downlink polarization and the LNB 128 polarization, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the SatA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port, 13 VDC with the 22 kHz tone would select another port of the multiswitch, etc. There can also be a modulated tone, typically a 22 kHz tone, where the modulation schema can select one of any number of inputs based on the modulation scheme.

To reduce the cost of the ODU 108, outputs of the LNBs 128 present in the ODU 108 can be combined, or "stacked," depending on the ODU 108 design. The stacking of the LNB 128 outputs occurs after the LNB has received and downconverted the input signal. This allows for multiple polarizations, one from each satellite 102-106, to pass through each LNB 128. So one LNB 128 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the LNBs 128 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, each LNB 128 can deliver the signals from the Ku-band, the A band Ka-band, and the B band Ka-band signals for a given polarization to the multiswitch. However, current IRD 112 and system 100 designs cannot tune across this entire frequency band, which limits the usefulness of this stacking feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120.

In addition, all inputs to the multiswitch are utilized by the current satellite 102-106 configuration, which prevents upgrades to the system 100 for additional satellite downlink signals 120 to be processed by the IRD 112. Further, adding another IRD 112 to a house 110 requires a cabling run back to the ODU 108. Such limitations on the related art make it difficult and expensive to add new features, such as additional channels, high-definition programming, additional satellite delivery systems, etc., or to add new IRD 112 units to a given house 110.

Even if additional multiswitches are added, the related art does not take into account cabling that may already be present within house 110, or the cost of installation of such multi-switches given the number of ODU 108 and IRD 112 units that have already been installed. Although many houses 110 have coaxial cable routed through the walls, or in attics and crawl spaces, for delivery of audio and video signals to various rooms of house 110, such cabling is not used by system 100 in the current installation process.

It can be seen, then, that there is a need in the art for a satellite broadcast system that can be expanded. It can also be seen that there is a need in the art for a satellite broadcast system that utilizes pre-existing household cabling to minimize cost and increase flexibility in arrangement of the system components.

SUMMARY OF THE INVENTION

To minimize the limitations in the prior art, and to minimize other limitations that will become apparent upon reading and understanding the present specification, the present invention discloses an automatic level control system for incoming signals of different signal strengths.

A system for delivering satellite signals to at least one Integrated Receiver Decoder (IRD) in accordance with the present invention comprises a plurality of inputs, designed to receive a plurality of satellite signals, wherein the satellite signals are directed to the inputs based on an originating satellite for each of the satellite signals, an automatic level controller, coupled to the inputs, for adjusting a signal strength associated with each the satellite signals such that each of the signal strengths are within a predetermined range, a multiswitch, having a plurality of inputs and a plurality of outputs, wherein at least one input of the multiswitch is coupled to the automatic level controller, and an interface, wherein at least one of the outputs of the multiswitch provides a signal to the interface, such that at least one new IRD coupled to an output of the interface receives a portion of a satellite signal based on commands sent to the interface from the new IRD.

Other features of the present invention comprise a second output of the multiswitch is a legacy output, wherein each legacy output selects an entire polarization of a satellite signal based on a Legacy IRD command sent directly to the multiswitch, the interface being a network interface, a controller, coupled to the plurality of outputs, for controlling signal flow between the multiswitch and the at least one new IRD, a network tuner, coupled between the output of the multiswitch and the interface, controlled by a service provider, each new IRD coupled to the multiswitch receiving signals on separate private channels in a respective fashion, and wherein the controller monitors a signal strength of the outputs of the interface and a signal strength of the legacy output. Additional features of the present invention also include the controller monitoring an identification of each new IRD and each legacy IRD coupled to the outputs of the microswitch, the controller refusing commands from a monitored IRD based on at least one of the group consisting of: the identification of the monitored ID, and the signal strength of the outputs of the interface, the automatic level controller reducing satellite signal strengths that are outside of the predetermined range, an automatic gain controller, coupled between the multiswitch and the interface, for controlling a portion signal strength of the portions of the satellite signals, the signal strength associated with a given new IRD is controlled based on a measurement made of conditions existing between the given new IRD and the interface, when the measurement exceeds a maximum value, commands received from the given new IRD are ignored by the automatic level controlled system, a plurality of tuners, coupled between the multiswitch and the interface, wherein each tuner is controlled by new IRDs in a respective fashion, a network tuner, coupled between the multiswitch and the interface, wherein the network tuner is controlled by a service provider and cannot be controlled by any new IRD, and where an output of the interface is a combined signal.

Other features include where the combined signal comprises a plurality of individual signals, a first individual signal comprising an output of the network tuner, and successive individual signals comprising signals selected by each of the new IRDs coupled to the interface in a respective fashion, and wherein each new IRD coupled to the interface receives the entire combined signal and tunes to the individual signals based on a mapping generated by the automatic level controlled system.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 7 illustrates a typical remapped signal in accordance with the present invention;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, there are three orbital slots, each comprising one or more satellites, delivering direct-broadcast television programming signals. However, ground systems that currently receive these signals cannot accommodate additional satellite signals, and cannot process the additional signals that will be used to transmit high-definition television (HDTV) signals. The HDTV signals can be broadcast from the existing satellite constellation, or broadcast from the additional satellite(s) that will be placed in geosynchronous orbit. The orbital locations of the satellites are fixed by regulation as being separated by nine degrees, so, for example, there is a satellite at 101 degrees West Longitude (WL), SatA 102; another satellite at 110 degrees WL, SatC 106; and another satellite at 119 degrees WL, SatB 104. Other satellites may be at other orbital slots, e.g., 72.5 degrees, 95, degrees, 99 degrees, and 103 degrees, and other orbital slots, without departing from the scope of the present invention. The satellites are typically referred to by their orbital location, e.g., SatA 102, the satellite at 101 WL, is typically referred to as "101." Additional orbital slots, with one or more satellites per slot, are presently contemplated.

The present invention allows currently installed systems to continue receiving currently broadcast satellite signals, as well as allowing for expansion of additional signal reception and usage. Further, the present invention allows for the use of pre-existing cabling within a given home such that the signal distribution within a home can be done without large new cable runs from the external antenna to individual set-top boxes.

System Diagram

Figure 3:
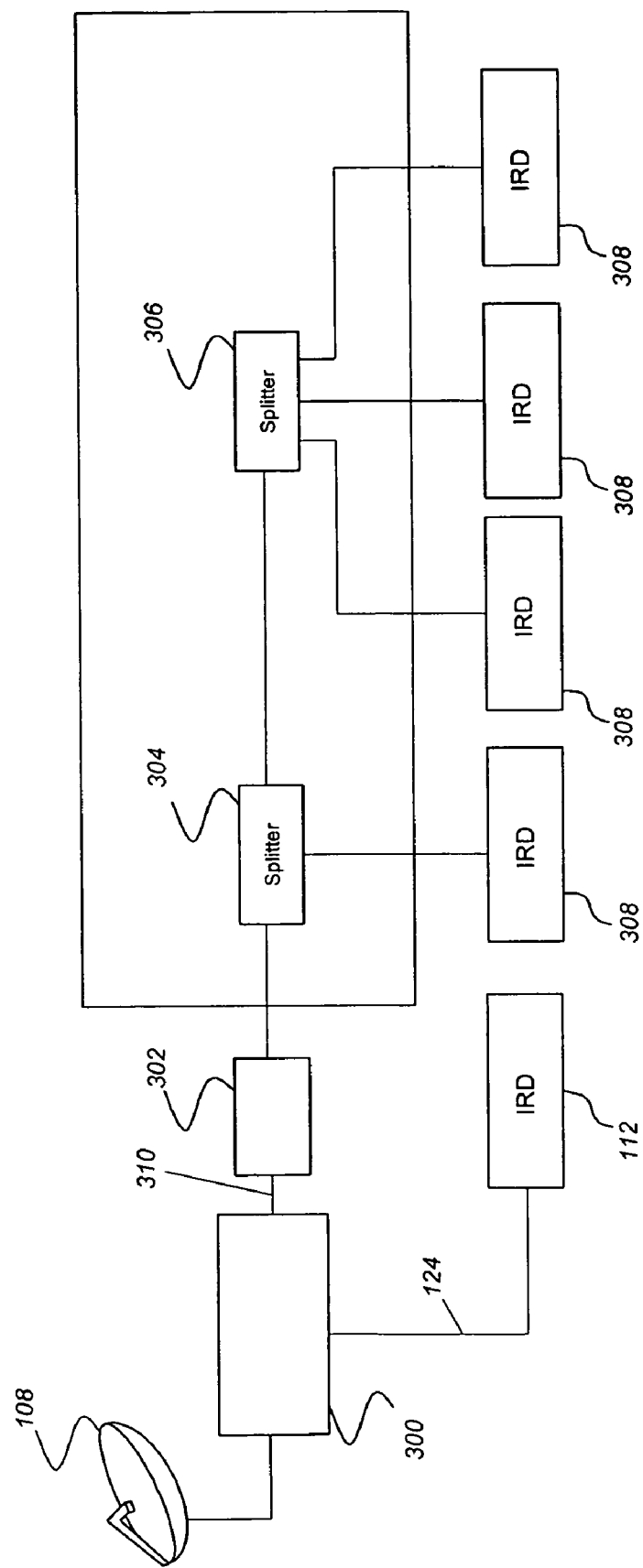
FIG. 3 illustrates a system diagram of the present invention.

FIG. 3 illustrates a system diagram of the present invention.

Figure 1:
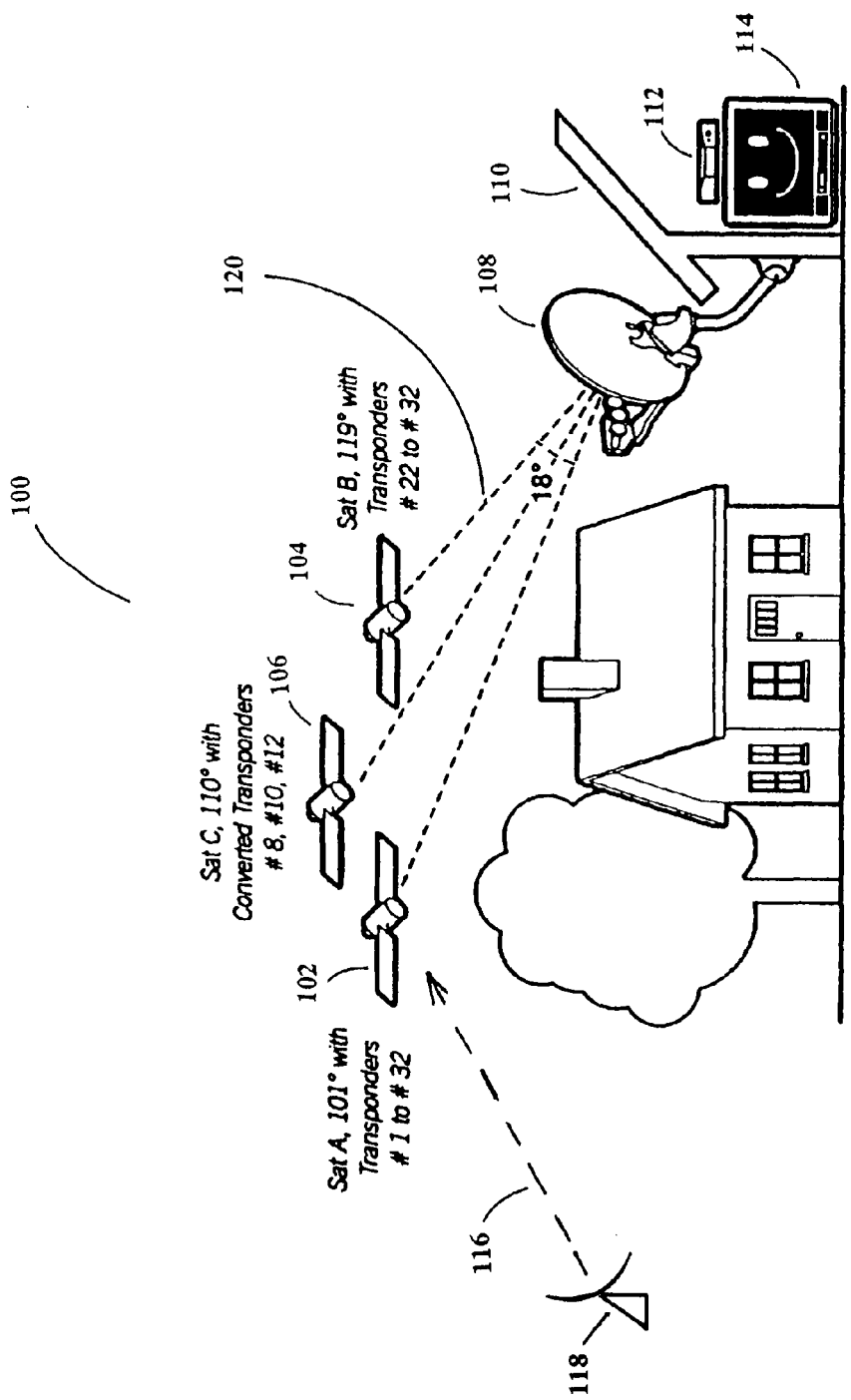
FIG. 1 illustrates a typical satellite television installation of the related art.
Figure 2:
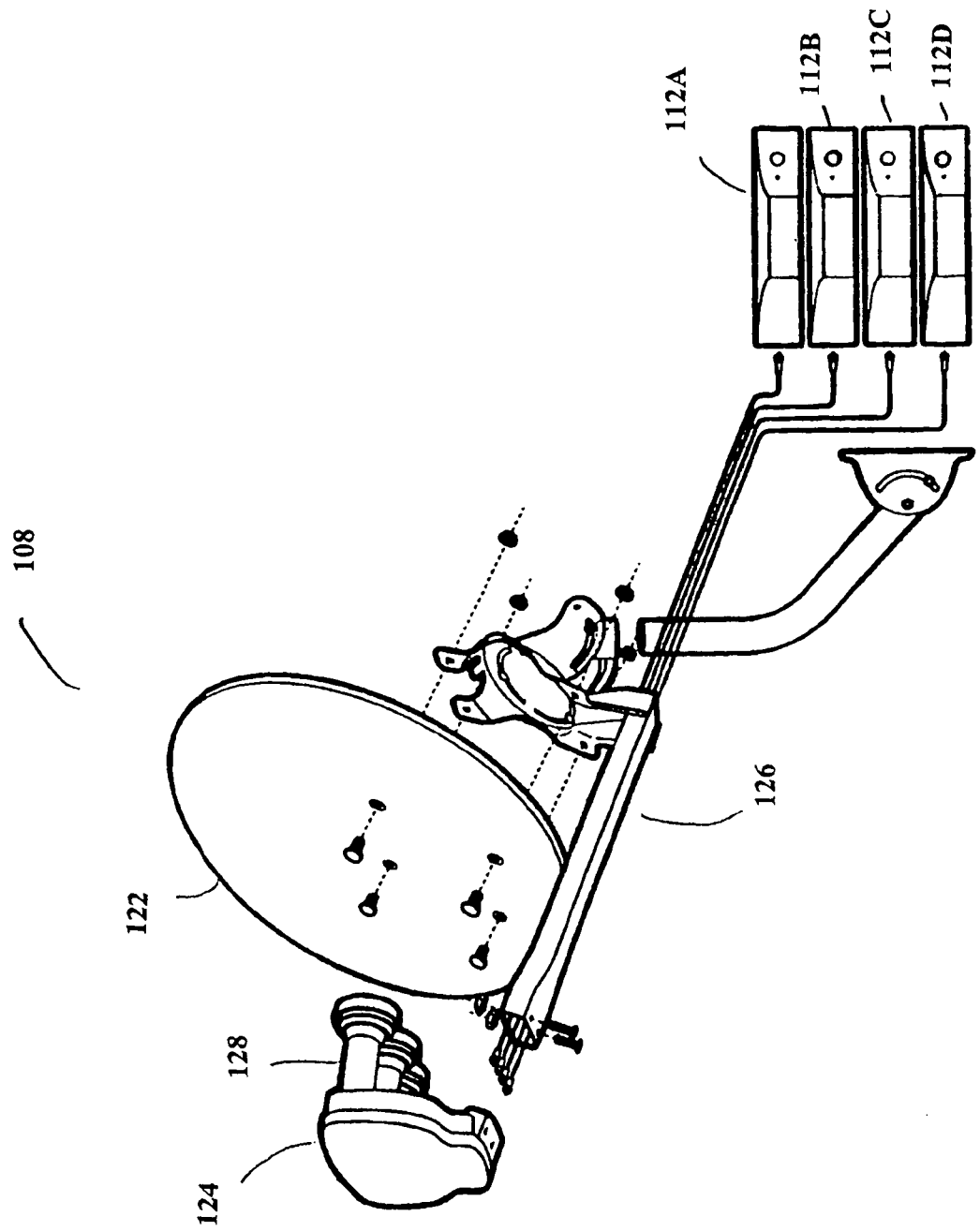
FIG. 2 illustrates a typical ODU of the related art.

In the present invention, ODU 108 is coupled to Frequency Translation Module (FTM) 300. FTM 300 is coupled to power injector 302. FTM 300 is able to directly support currently installed IRD 112 directly as shown via cable 124, as described with respect to FIGS. 1 and 2.

The present invention is also able to support new IRDs 308, via a network of signal splitters 304 and 306, and power injector 302. New IRDs 308 are able to perform two-way communication with FTM 300, which assists IRDs 308 in the delivery of custom signals on private IRD selected channels via a single cable 310. Each of the splitters 304 and 306 can, in some installations, have intelligence in allowing messages to be sent from each IRD 308 to FTM 300, and back from FTM 300 to IRDs 308, where the intelligent or smart signal splitters 304 and 306 control access to the FTM 300.

The two-way communication between IRDs 308 and FTM 300 can take place via cable 310, or via other wiring, such as power distribution lines or phone lines that are present within house 110.

It is envisioned that one or more possible communications schema can take place between IRD 308 and FTM 300 such that existing wiring in a house 110 can be used to deliver satellite signals and control signals between IRD 308 and FTM 300, such as an RF FSK approach or an RF ASK approach discussed herein. Such schema include, but are not limited to, a digital FTM solution, a remultiplexed (remux) FTM solution, an analog FTM solution, and a hybrid FTM solution. These solutions, and other possible solutions, are discussed hereinbelow.

Remux FTM

Figure 4:
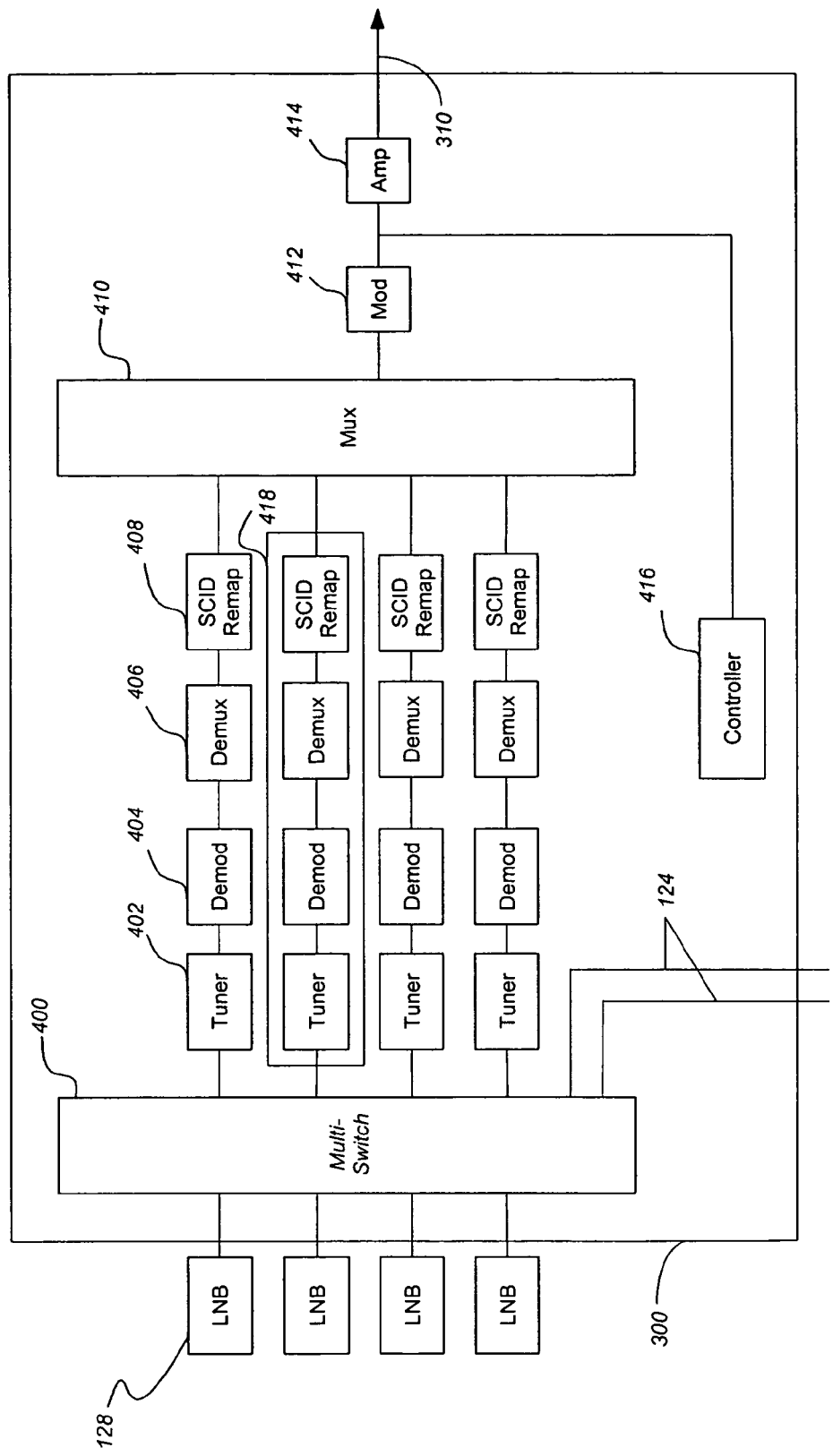
FIG. 4 is a detailed block diagram of the frequency translation module of the present invention.

FIG. 4 is a detailed block diagram of the frequency translation module of the present invention.

FTM 300 shows multiple LNBs 128 coupled to multiswitch 400. Multiswitch 400 supports current IRDs 112 via cable 124. Multiple cables 124 are shown to illustrate that more than one current IRD 112 can be supported. The number of current IRDs 112 that can be supported by FTM 300 can be more than two if desired without departing from the scope of the present invention.

Multiswitch 400 has several outputs coupled to individual tuners 402. Each tuner 402 can access any of the LNB 128 signals depending on the control signals sent to each tuner 402. The output of each tuner 402 is a selected transponder signal that is present in one of the downlink signals 120. The method of selection of the transponder will be discussed in more detail below.

After tuning to a specific transponder signal on each tuner 402, each signal is then demodulated by individual demodulators 404, and then demultiplexed by demultiplexers 406.

The outputs of each of the demultiplexers 406 is a specific packet of information present on a given transponder for a given satellite 102-106. These packets may have similar nomenclature or identification numbers associated with them, and, as such, to prevent the IRDs 308 from misinterpreting which packet of information to view, each packet of information is given a new identification code. This process is called re-mapping, and is performed by the SCID remappers 408. The outputs of each of the SCID remappers 408 are uniquely named packets of information that have been stripped from various transponders on various satellites 102-106.

These remapped signals are then multiplexed together by mux 410, and remodulated via modulator 412. An amplifier 414 then amplifies this modulated signal and sends it out via cable 310.

The signal present on cable 310 is generated by requests from the individual IRDs 308 and controlled by controller 416. Controller 416 receives the requests from IRDs 308 and controls tuners 402 in such a fashion to deliver only the selected transponder data (in an Analog FTM schema) or individualized packets of interest within a given transponder to all of the IRDs 308 in a given house 110.

In the related art, each of the cables 124 delivers sixteen (16) transponders, all at one polarization, from a satellite selected by IRD 112. Each IRD 112 is free to select any polarization and any satellite coupled to multiswitch 400. However, with the addition of new satellites and additional signals, the control of the multiswitch 400 by current IRDs 112, along with limitations on the tuner bandwidth available within the IRDs 112, provide difficult obstacles for distribution of signals within the current system 100. However, with tuners 402 located outside of individual IRDs 308, where the IRDs 308 can control the tuner 402 via controller 416, the system of the present invention can provide a smaller subset of the available downlink signal 120 bandwidth to the input of the IRD 308, making it easier for the IRD 308 to tune to a given viewer channel of interest. In essence, it adds additional stages of downlink signal 120 selection upstream of the IRD 308, which provides additional flexibility and dynamic customization of the signal that is actually delivered to individual IRDs 308.

Further, once the additional satellites are positioned to deliver Ka-band downlink signals 120, the FTM 300 can tune to these signals using tuners 402, and remodulate the specific transponder signals of interest within the Ka-band downlink signals 120 to individual IRDs 308 on cable 310. In this manner, the tuners present within each IRD 308 are not required to tune over a large frequency range, and even though a larger frequency range is being transmitted via downlink signals 120, the IRDs 308 can accept these signals via the frequency translation performed by FTM 300.

As shown in FIG. 4, chain 418, which comprises a tuner 402, demodulator 404, demultiplexer 406, and SCID remapper 408, is dedicated to a specific IRD 308. As a given IRD 308 sends requests back to FTM 300, each chain 418 is tuned to a different downlink signal 120, or to a different signal within a downlink signal 120, to provide the given IRD 308 the channel of interest for that IRD 308 on the private channel.

Although chain 418 is shown with tuner 402, demodulator 404, demultiplexer 406, and SCID remapper 408, other combinations of functions or circuits can be used within the chain 418 to produce similar results without departing from the scope of the present invention.

Digital FTM

Figure 4A:
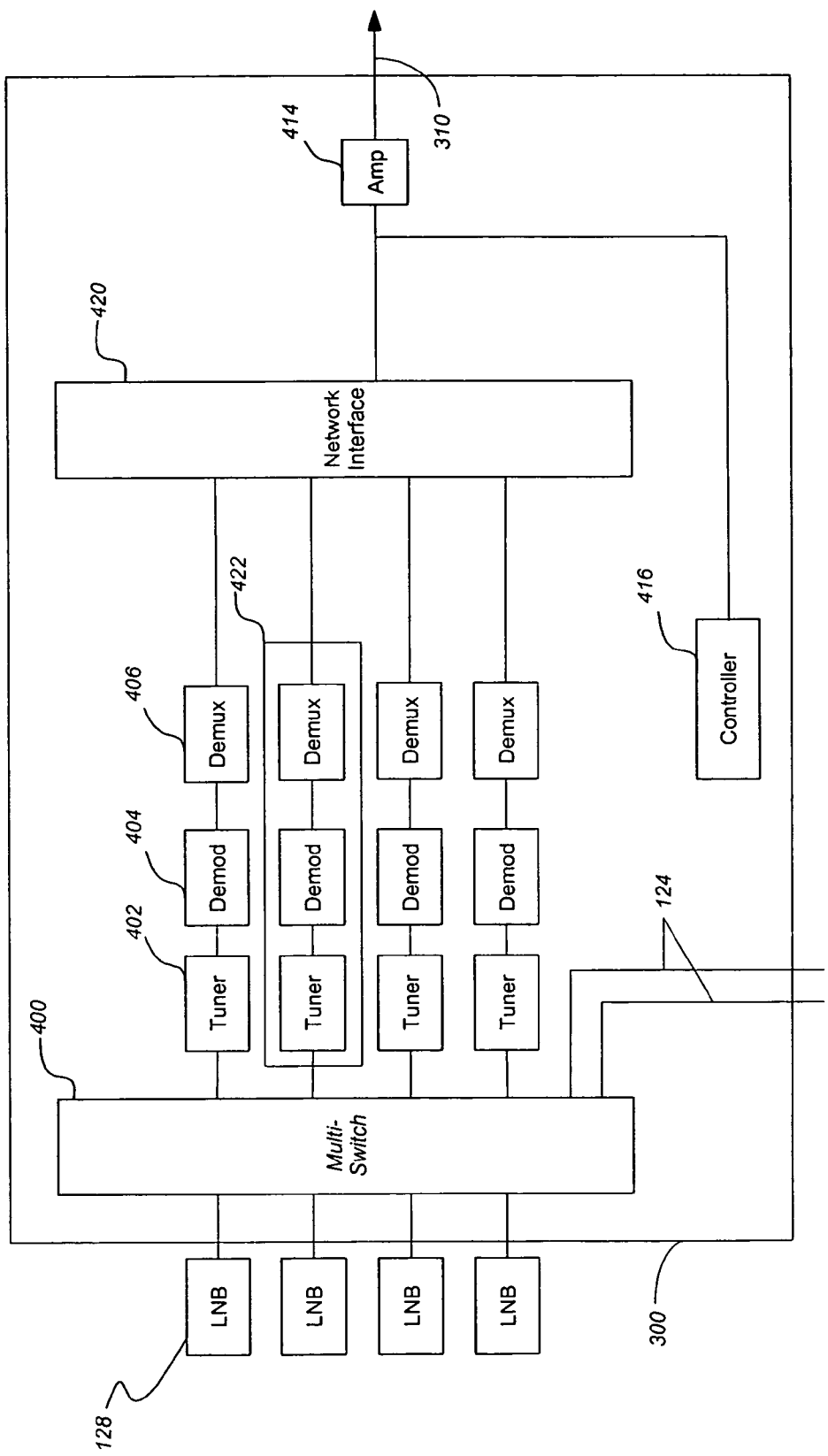
FIG. 4A illustrates a digital FTM solution in accordance with the present invention.

FIG. 4A illustrates a digital FTM solution in accordance with the present invention.

Rather than remap the signals onto an RF signal, the digital FTM solution sues a network interface 420 which can use standard network protocols to communicate between the FTM 300 and the IRD 308, much like the interface between two computers in a network. Since the tuner 402, demodulator 404, and demultiplexer 406 have separated out the majority of the unnecessary signals from the downlink signal 120, the signals from each chain 422 can be placed sequentially or in an encoded fashion through network interface 420, and transmitted to each of the IRDs 308 coupled to FTM 300. Controller 416 acts as a local processor to control the network traffic. Operation of the system is similar to that of the system described in FIG. 4, however, each IRD 308 in a digital FTM solution as shown in FIG. 4A no longer requires a tuner. The network interface 420 is substantially repeated in each IRD 308, and the digital information is transcribed into video format much like video transcription on computer networks.

Installation Related Issues

Figure 5:
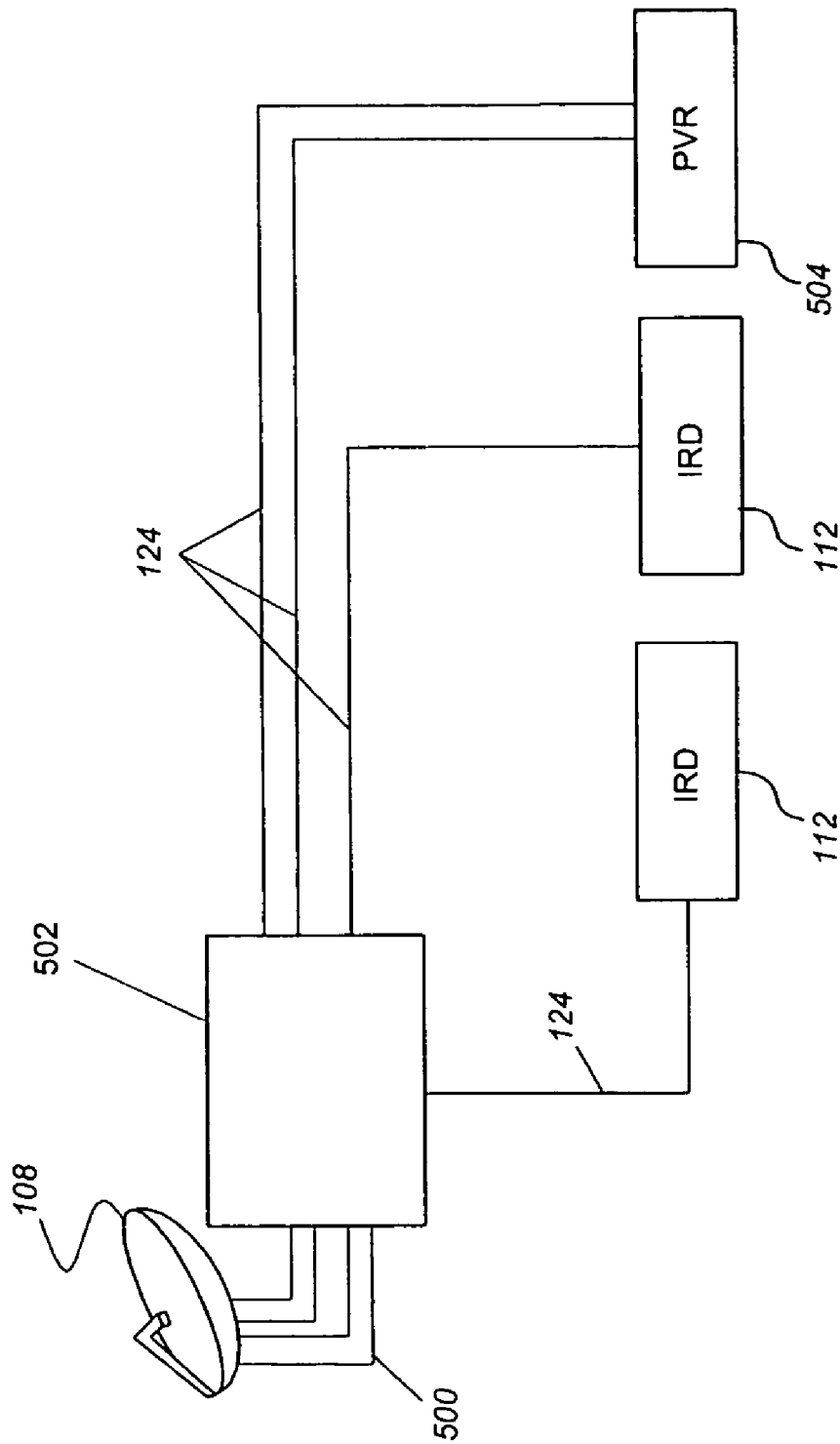
FIG. 5 illustrates a typical home installation of the related art.

FIG. 5 illustrates a typical home installation of the related art.

ODU 108 has cables 500 that couple LNBs 108 to multiswitch 502. Multiswitch 502 is used to distribute the satellite downlink signals 120 received at ODU 108 throughout house 110. Multiswitch 502 allows each IRD 112, or Personal Video Recorder (PVR) 504, access to the satellite downlink signals 120 via cables 124. Each tuner present in the system must have a dedicated cable 124 that runs from the IRD 112 or PVR 504 all the way to multiswitch 502. Other configurations can be envisioned, such as an IRD 112 with multiple inputs, PVRs 504 with more than two tuners, network tuner applications, etc., without departing from the scope of the present invention.

Standard configurations of multiswitches 502 accommodate the number of IRDs 112 and PVRs 504 present within a given installation or house 110. These can be, for example, a 4×8 multiswitch, where four inputs from ODU 108 are distributed into eight outputs, where each output can deliver signals to the IRDs 112 and PVRs 504. Although all multiswitches 502 have internal elements requiring power, the power can be drawn from the IRDs 112, or from an external source.

The multiswitch 502, in current installations, is non-discriminatory; it provides all of the data present within a given polarization of a downlink signal 120 to the tuners within the IRDs 112 and PVRs 504. This is sixteen times the amount of bandwidth necessary to drive the individual tuners within the IRDs 112 and PVRs 504.

The necessity of one cable 124 per tuner in IRDs 112 and PVRs 504 is driven by the commands used to control the multiswitch 502, and the bandwidth on cables 124 is completely populated in the current system. Such a necessity of one cable 124 per tuner makes installation of such systems costly; each installation requires new cables 124 dependent upon the number of IRDs 112 and PVRs 504 resident in the home. Further, once a PVR 504 is installed in a given room, it cannot be moved to a new location without installing a second cable 124 to the new location.

Two-Way Communication Schema

Figure 6:
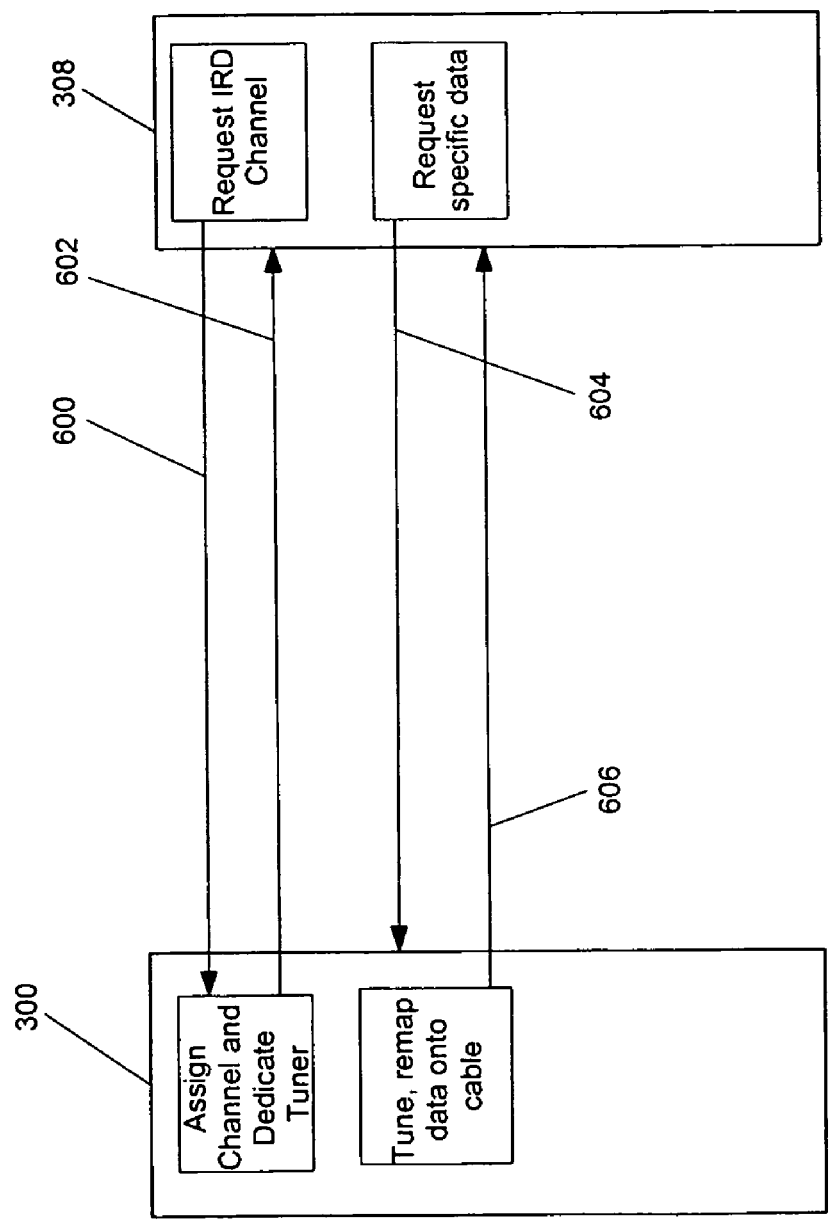
FIG. 6 illustrates the general communication schema used within the present invention.

FIG. 6 illustrates the general communication schema used within the present invention.

Unlike the one-way communication of voltage and tone used in the related art, the present invention sends communications in two directions between IRD 308 and FTM 300. After installation, IRD 308 sends a private IRD channel request 600 to the FTM 300. This request can be sent when the IRD 308 is powered on, or at any time the IRD 308 is on and needs a new private channel. Such occurrences may take place after a periodic time, or during troubleshooting of the system, or at other desired times.

Once the request 600 is received by the FTM 300, FTM 300 assigns an IRD private channel to the IRD 308, and dedicates one of the chains 418 or 422 including tuner 402, etc. to a specific IRD 308. The channel information and decoding schema for the IRD private channel for each IRD 308 is sent back as acknowledgement 602 from FTM 300 to RD 308.

As the IRD 308 needs data, e.g., viewer channel requests are made, etc., the specific data request 604 is sent from IRD 308 to FTM 300. FTM 300 then determines which downlink signal 120 has the requested data, uses the tuner 402 to tune to the downlink signal 120 of interest, demodulates and demultiplexes the downlink signal 120 of interest, and finds the data packet requested. This data is then given a specific identification tag that the IRD 308 was given during acknowledgement 602. The data is then placed on the output of FTM 300, and IRD 308 is sent a data request acknowledgement 606 from FTM 300. Specific protocols are discussed hereinbelow, but the present invention is not limited to any specific protocol.

Further, as additional IRDs 308 are coupled to FTM 300, as shown in FIG. 3, FTM 300 performs the same logical operations as described with respect to FIG. 6 for each IRD 308. As such, each IRD 308 uses tuners 402 in FTM 300 to tune to specific data channels, and receives the data in the form of identified data packets on the cable 310.

As such, since the FTM 300 assigns private channels to each requesting IRD 308 or PVR 504, the tuners present in each IRD 308 or PVR 504 are able to receive the programming data on a single wire, and each tuner within the IRD 308 or PVR 504 can look for the private channel information present on the IRD selected channel signal. This eliminates the requirement of running multiple wires or cables from a PVR 504 to the multiswitch 502 as described in the prior art. The FTM 300 is capable of manipulating the incoming downlink signals 120, whereas the multiswitch 502 of the related art, standing alone, is not. This extra layer of signal discrimination and selection enables the IRD 308 and PVR 504 to receive all of the requested signals on a single wire, with each IRD 308 and PVR 504 being able to view the signals of interest to a given IRD 308 and PVR 504.

FIG. 7 illustrates a typical remapped signal in accordance with the present invention.

In an installation, multiple IRDs 308 or PVRs 504 request specific information, e.g., each IRD 308 or PVR 504 requests specific viewer channels for recording or viewing. In a digital FTM 300 installation, packets of information can be filtered out as described above.

For example, and not by way of limitation, in a given house 110 there are two IRDs 308 and a PVR 504, which request four different viewer channels or packets of information. These requests are sent from each IRD 308 and PVR 504 to the FTM 300, which determines where those viewer channels are located on the downlink signals 120.

Once the FTM 300 determines where the requested information is located, the FTM 300 assigns one of the tuners 402 to tune to the transponder where the first requested information is located, a second tuner 402 to tune to the second transponder where the second requested information is located, etc. As shown by example in FIG. 7, one of the tuners 402 is assigned to tune to transponder 1, a second tuner 402 is assigned to tune to transponder 2, a third tuner 402 is assigned to tune to transponder 3, and a fourth tuner 402 is assigned to tune to transponder 16. The transponders can be from the same satellite downlink signal 120, or from different satellite downlink signals 120, since each tuner can request any satellite downlink signal 120 by proper application of voltage, tone, or modulated tone to the multiswitch as described herein.

After tuning, since the FTM 300 knows which packet within each transponder data stream is desired, the FTM 300 programs the demodulator 404 and demultiplexer 406 associated with each tuner to extract the desired packet information from the transponder data stream. So, continuing with the example of FIG. 7, FTM 300 programs the first tuner 402 to tune to transponder 1 at 950 MHz, which will output transponder 1 signal 700. The FTM 300 programs demodulator 404 and demultiplexer 406 to look for information in packet 1 (also called SCID 1) 702 of signal 700, which will be the output of the demultiplexer 406. Similarly, other tuners 402 are tuning to transponders 2, 3, and 16, to generate signals 704, 706, and 708, respectively.

Within signal 704, SCID 2 710 information has been requested by one of the IRDs 308 or PVRs 504, and FTM 300 programs the appropriate demodulator 404 and demultiplexer 406 to deliver that information. Similarly, other demodulators 404 and demultiplexers 406 are programmed to deliver SCID 1 712 from signal 706 and SCID 2 714 from signal 708.

The SCID 702 and 710-714 information is then remultiplexed or otherwise combined onto a single signal 716, which is distributed via cable 310 to all IRDs 308 and PVRs 504. However, as shown in the example of FIG. 7, there may be SCID information that has similar nomenclature, e.g., SCID 1 702 and SCID 1 712 both have a "1" as the packet number. Before the SCID 1 702 and SCID 1 712 information is placed into signal 716, a renumbering or remapping of the information must take place, so that the individual IRDs 308 or PVRs 504 can determine which packet of information to tune to on signal 716. As shown, SCID 1 702 is renumbered or remapped as SCID 11 718, SCID 2 710 is renumbered or remapped as SCID 720, SCID 1 712 is renumbered or remapped as SCID 31 722, and SCID 2 714 is renumbered or remapped as SCID 42 724. Many other methods of remapping or renumbering are possible given the present invention, and the present invention is not limited to the remapping schema shown in FIG. 7.

Once each SCID 718-724 has a unique SCID number associated with it on signal 716, each of the IRDs 308 or PVRs 504 knows where to look for the viewer channel information that is of interest for any given IRD 308 or PVR 504. So, for example, the first IRD 308 that requested information from FTM 300 is assigned to the first tuner 402, and also is assigned private channel 1, so that any SCID information on signal 716 will have a SCID identifier of "1x," shown as SCID 11 718. Similarly, the second IRD 308 or PVR 504 that requests information is assigned to the second tuner 402, and is assigned private channel 2, etc. As such, each IRD 308 tuner is tuned to the same frequency, and are using different SCID maps to demodulate the signal 716. An alternative is to have different frequencies for the signal 716, such that each IRD 308 tuner can tune to different frequencies and/or different SCID maps to find the signal assigned to that specific IRD 308 private channel. Any combination of frequency or remapping or other differentiation can be used to assign private channels to the various IRD 308 and PVR 504 connected to FTM 300 without departing from the scope of the present invention.

Optionally, if two IRDs 308 or PVRs 504 are requesting the same SCID information, i.e., the same packet of information from the same transponder from a given satellite, the FTM 300 can recognize that two identical information requests have been made and can temporarily reassign one of the IRDs 308 or PVRs 504 to view the already remapped information. Continuing with the example of FIG. 7, after the signal 716 is assembled, one of the IRDs 308 may want to switch viewer channels from the information present in SCID 31 722 to the information present in SCID 11 718. Rather than place SCID 1 702 information into multiple places (SCID 31 722 and SCID 11 718, for this example) in the signal 716, the FTM can re-assign the channel identifier to the IRD that was looking at SCID 31 722 to allow access to the information in SCID 11 718.

In addition, there can be a tuner 402 within the FTM 300 that cannot be user controlled, e.g., by commanding the tuners by viewer channel request through the IRDs 308 and PVRs 504. Such a tuner 402 is commonly referred to as a "network tuner." A network tuner 402 is not meant to be under user control, but instead, is designed to be under service provider control. A network tuner 402 would be available to all IRDs 308 and PVRs 504 regardless of the private channel allocations made by FTM 300. So for example, and not by way of limitation, where remapped signals have a "1x" or "2x" designation, the network tuner may have a "0x" designation, so any SCID 0x packets in the signal 716 can be viewed by any IRD 308 or PVR 504 connected to cable 310 and receiving signal 716. A network tuner 402 typically provides emergency audio/video information, or is otherwise a dedicated chain of tuner 402, etc. that the service provider can use to provide information other than viewer channels to each IRD 308 and PVR 504. Further, a network tuner 402 can be defined as an entire chain 418 or 422, and can be present in either the FTM 300 or in the IRD 308 or PVR 504 without departing from the scope of the present invention.

Analog FTM

Figure 8A:
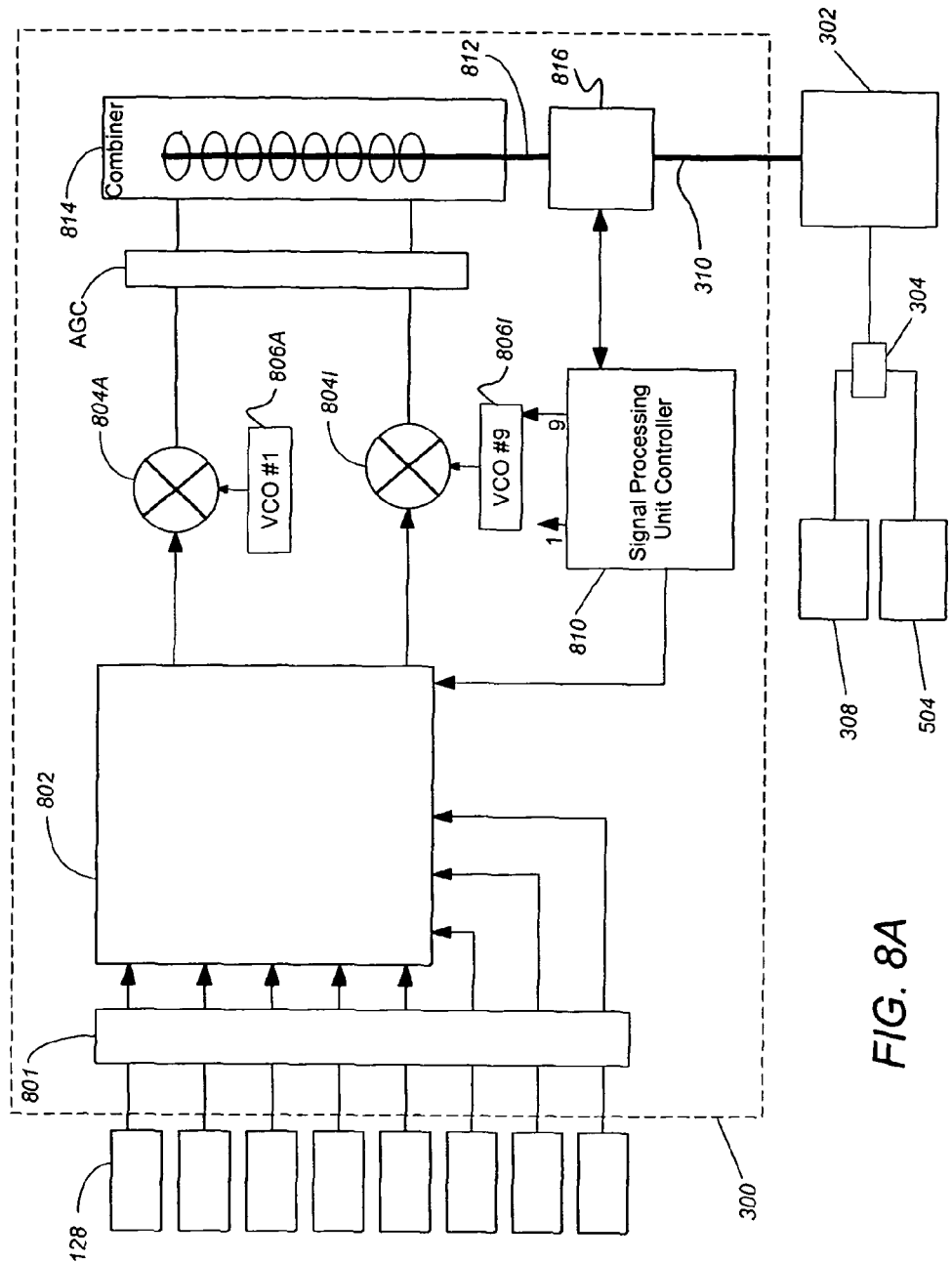
FIG. 8A illustrates an alternative block diagram of the frequency translation module of the present invention.

FIG. 8A illustrates an alternative block diagram of the frequency translation module of the present invention.

System 800 shows multiple LNBs 128 coupled to FTM 300. Within FTM 300 is an automatic level controller 801 and multiswitch 802, which accepts the inputs from the LNBs 128 and can deliver any one of the LNB 128 signals to any output of the multiswitch 802 as described earlier.

Automatic Level Control

The automatic level controller 801 provides attenuation for high level downlink signals 120 or LNB 128 outputs, which allows for balanced signal levels being input to the multiswitch 802. The automatic level controller 801 reduces crosstalk within the multiswitch 802, because the dynamic range of the multiswitch 802 is limited. By reducing the dynamic range of the signals entering the multiswitch 802, the crosstalk and other interactions within the multiswitch are reduced.

Alternatively, the automatic level controller 801 can amplify weaker signals, but such an approach usually adds noise to the system 800. The automatic level controller can be used in either the analog FTM system 800, or in a hybrid or digital FTM system as shown in FIGS. 4 and 4A.

Signal Throughput

Coupled to the outputs of the multiswitch 802 are mixers 804A through 804I and corresponding Voltage Controlled Oscillators (VCOs) 806A through 806I. Each mixer 804 and VCO 806 pair act as a tuner which tunes to a specific transponder of a given downlink signal 120. The outputs of the mixers 804A-804I are individual transponder data streams 808A-808I, such as those shown as signals 700, 704, 706, and 708 in FIG. 7.

The voltages used to control VCOs 806A-806I are supplied by controller 810, which is used to map the viewer channel requests sent by IRDs 308 and PVRs 504 into transponder locations for the data associated with each viewer channel request. So, for example, and not by way of limitation, if IRD 308 requests the assigned channel number that broadcasts Fox News Channel, this request is translated by FTM 300, by way of a programmable look-up table or other methods, into the satellite 102-106 that is broadcasting Fox News Channel and the transponder on the satellite 102-106 that is broadcasting Fox News Channel. Other methods can be used, such as a protocol that includes extended tuning commands, which would avoid a lookup table, or a pick and place system which would place a specific channel into the private channel. The present invention is not limited by the methodology used to control the selection of information placed into the private channel.

If, for example, SatA 102 is broadcasting Fox News Channel on transponder 4, SCID 2, the request from IRD 308 is translated by FTM 300 to provide SatA 102 downlink signal 120 to the mixer 804A that has been assigned to IRD 308, and a voltage is provided to VCO 806A to tune to transponder 4 of the SatA 102 downlink signal 120. Thus, all of transponder 4 data, which includes other viewer channels that have not been requested by IRD 308, will be output from mixer 804A. Other viewer channel requests are handled in a similar manner by the other tuners 804B-I and VCOs 806B-I as controlled by controller 810. Further, viewer channel requests could be made by single viewer channels, and mapped into the FTM 300, or a port selection using an auto-discovery mode, with some raw commands, could be passed through to the FTM 300, where the controller 416 is sued to decipher the commands and information. The present invention is not limited by the methodology used to determine the contents of the private channel.

Each of the selected transponder signals 808A-I are then combined into a single data stream 812 by combiner 814. Controller 810, in a similar fashion to that described in the digital FTM 300 schema, has assigned a tuning frequency to each of the IRDs 308 and PVRs 504, so that each IRD 308 and PVR 504 know where in data stream 812 their signal of interest is. This can be done by telling IRD 308 that is assigned to mixer 804A that the signal 808A will be centered on a specific frequency in the signal 812, so that IRD 308 will center their tuning band at that specific frequency. Other methods can be used without departing from the scope of the present invention.

Automatic Gain Control

The Automatic Gain Control (AGC) portion is used after the mixer 804A and before combiner 814. Each transponder on the satellites can have an AGC to boost the signal for a specific IRD 308. Each IRD 308 typically is located at a different distance from the FTM 300, and, as such, cable losses between the IRD 308 and FTM 300 will differ. As such, the FTM can control the gain of individual portions of the private channel signal to allow the portion of the private channel signal to be easily received at each IRD 308 in the system.

Once combined, the signal 812 is translated into a frequency that can be understood by the IRDs 308 and PVRs 504 by modulator 816. Depending on the output of combiner 814, the modulator 816 may not be necessary. The IRDs 308 and PVRs 504 are connected to the FTM 300 via a single cable 310 as shown, with power injector 302 inserted between the FTM 300 and IRDs 304 to assist with the communication between FTM 300 and IRDs 308. Further, splitters 304 are inserted as necessary to provide the signal to all IRDs 308 and PVRs 504 within a given installation.

Shift Keyed Control

Figure 8B:
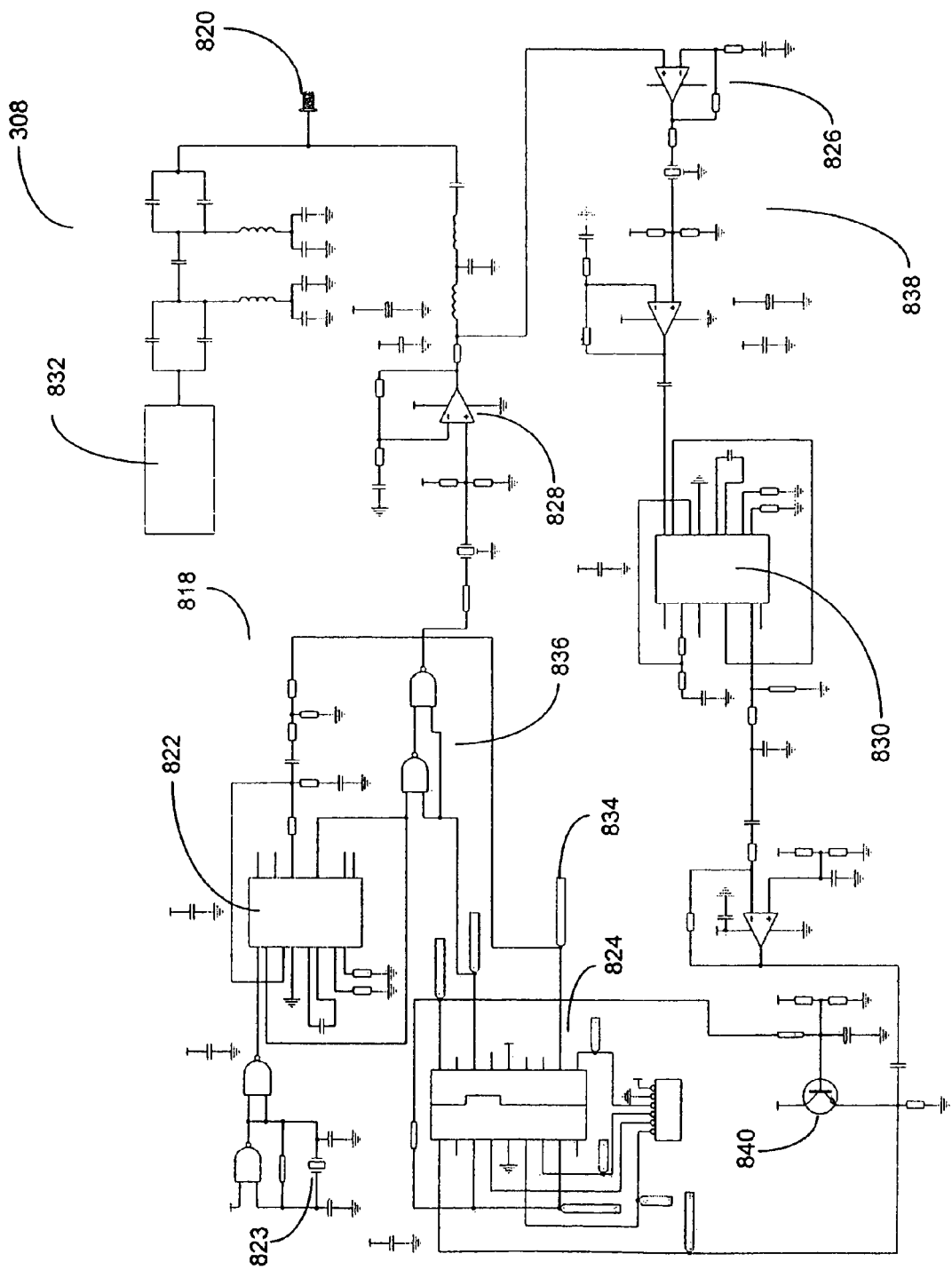
FIG. 8B illustrates a Shift Keyed Controller of the present invention.

FIG. 8B illustrates a Shift Keyed Controller of the present invention.

FIG. 8B illustrates the Shift Keyed Control (RF modem) 818 portion of IRD 308. The output 820 of IRD 308 is shown, along with oscillator 822, crystal 823, microcontroller 824, transmit amplifier 826, receive amplifier 828, receive demodulator 830, and network interface 832.

Microcontroller 824 provides IRD 308 with an RF interface control which can be used to control the FTM 300 using commands which travel between FTM 300 and IRD 308. This can be done using a Frequency Shift Keyed (FSK) schema as shown herein, but other command schema, such as Amplitude Shift Keyed (ASK) or Phase Shift Keyed (PSK) schema can be utilized without departing from the scope of the present invention.

Interfaces

Typically, the RF modem 818 is implemented within the IRD 308, but the RF modem 818 can be a stand-alone device if necessary to retrofit legacy IRDs 112. The output 820 is coupled to specific transmit and receive sections of the shift keyed control as described herein to allow for shift key control of the RF signals travelling between IRD 308 and FTM 300.

The microcontroller 824 uses signals and interrupts to notify various portions of the RF modem 818 and the remainder of the IRD 308, as well as the FTM 300, that the IRD 308 wants to send commands to the FTM 300 and/or has received commands from the FTM 300. Although these signals are typically SCL and SDA signals, and an interrupt signal from the microcontroller 824 to other microcontrollers within the system 100, other signals and interrupts can be used without departing from the scope of the present invention.

The RF modem 818 section typically operates at a center frequency $f_o$ of 2.295 MHz, and uses a modulation schema of 2-FSK. The deviation from the center frequency $\Delta f$ is typically 40 kHz, where a "0" bit is defined as $f_o - \Delta f$ and a "1" bit is defined as $f_o + \Delta f$. Other definitions and frequency plans are possible within the scope of the present invention.

Transmit Mode

In transmit (TX) mode, the RF modem 818 translates the digital signals from the microcontroller 824 into RF signals. The signals are typically modulated or demodulated using a 2-FSK schema on an RF carrier.

Crystal 823 sets a reference frequency which is supplied to oscillator 822. The modulation voltage is also fed into oscillator 822 from microcontroller 824 via signal 834.

The output of oscillator 822 is selectively passed through filter 836, based on inputs from microcontroller 824, to block or pass the modulated signal output from oscillator 822. This signal is then amplified by TX amplifier 828 and output from the RF modem 818 on output 820.

Receive Mode

In receive (RX) mode, the RF modem 818 translates the RF signals into digital signals for the microcontroller 824. Signals enter through output 820 and are amplified by RX amplifier 826. The amplified signal is bandpass filtered with filter 838 and amplified again. This twice amplified and filtered signal is then sent to demodulator 830. The output from demodulator 830 is clamped by transistor 840, and the command is sent to microcontroller 824 for further processing.

System Control Signal Paths

Figure 9:
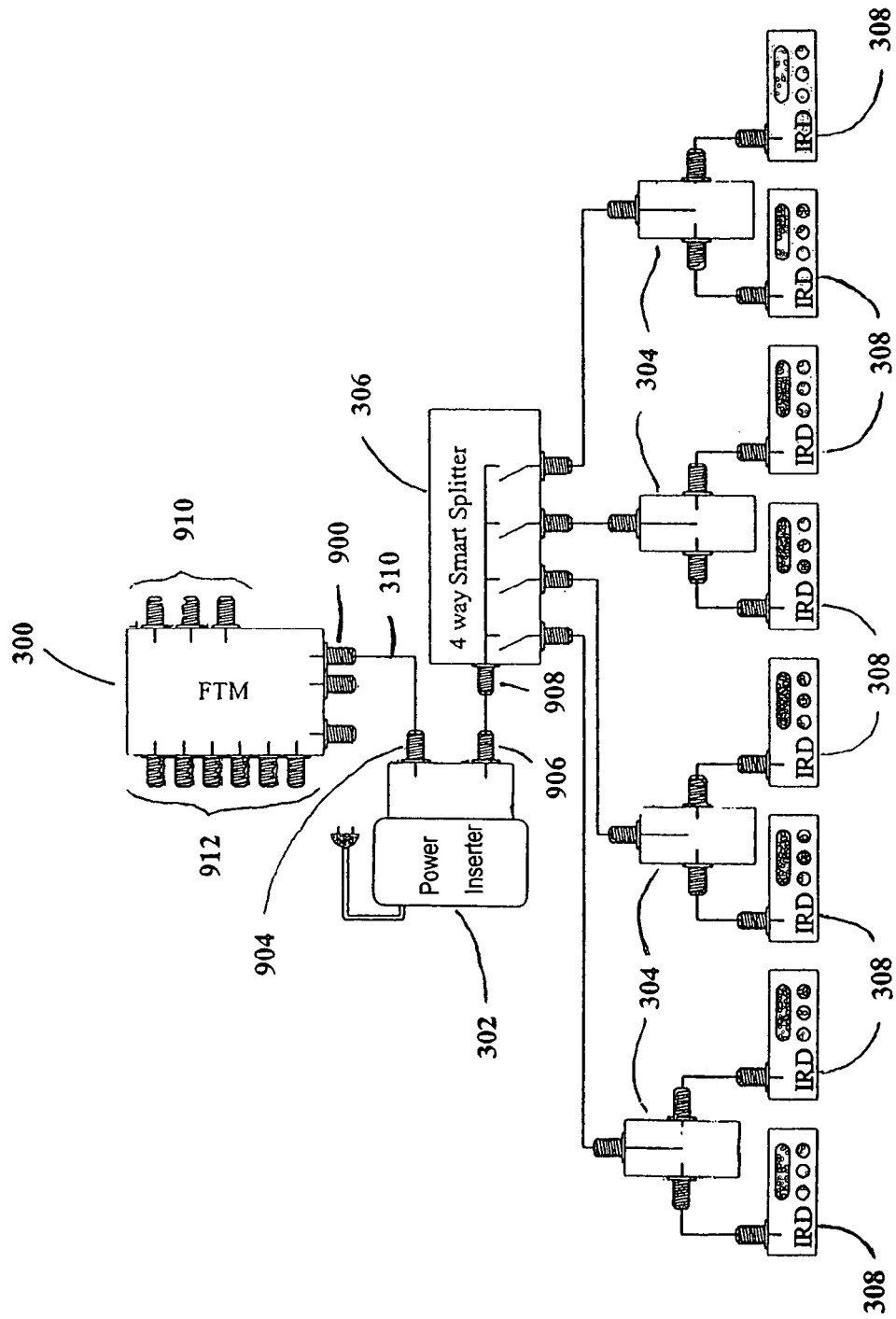
FIG. 9 illustrates a block diagram of a power injector in accordance with the present invention.

FIG. 9 illustrates a block diagram of the signal paths from the FTM to the IRD in accordance with the present invention.

FTM 300 is shown as having an interface 900 which is coupled to power injector 302 at interface 904. In turn, power injector 302 has an interface 906 coupled to splitter 306 at interface 908. The other interfaces of splitter 306 are coupled to other splitters 304, which in turn are coupled to IRDs 308. Each IRD 308 shown in FIG. 9 can be a PVR 504 if desired.

The cable 310 contains the Radio Frequency (RF) signals that have been processed by the FTM 300 as described with respect to FIGS. 3 and 8. These signals are then promulgated to the various IRDs 308 and PVRs 504 present in the system. Further, other interfaces 910 provide legacy IRDs 108 access to the LNB inputs 912.

To simplify the connections required between IRDs 308 and FTM 300, the same coaxial cable 310 that is used to promulgate the IRD requested signal 812 (or 416 from the Digital FTM 300 in FIG. 4) also carries the IRD 308 generated requests for viewer channel information back to the FTM 300. Alternatively, since IRD 308 and power injector 302 are both connected to house power lines at 110V, 60 Hz, power lines can be used to promulgate the commands between IRD 308 and power injector 302.

Since the voltages and lower frequency commands are promulgated between FTM 300 and IRD 308, and these commands must be sent individually to each IRD 308, the splitters 304 and 306, as well as the power injector 302, must be able to control the command path independent of the RF signal path, so that each IRD 308 continuously receives the IRD requested signal 812 or 416, but has selective communication with FTM 300. The selective communication path is discussed with respect to the power injector 302 and splitters 304 and 306 below.

Power Injector

Figure 10:
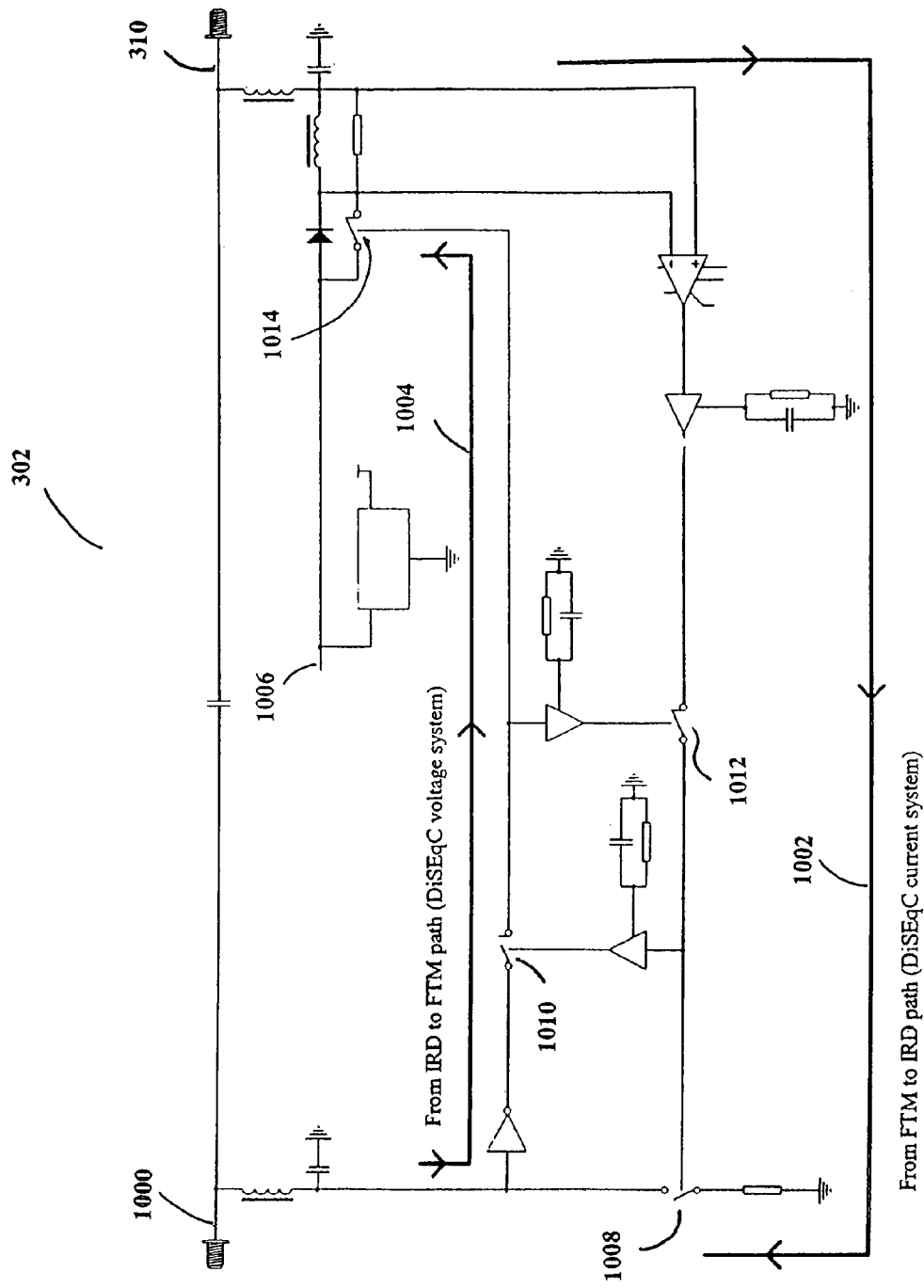
FIG. 10 is a block diagram of the power injector in accordance with the present invention.

FIG. 10 is a block diagram of the power injector in accordance with the present invention.

Power injector 302 is coupled to FTM 300 by cable 302 and to IRD 308 by cable 1000. Additional portions of the connection to IRD 308 are described in FIGS. 11 and 12. Power injector 302 comprises a path that allows FTM 300 information to flow to IRDs 308, e.g., satellite downlink signals 120. Further, power injector 302 comprises a path for information to flow from IRDs 308 to FTM 300, e.g., voltage and tone signals for selection of ports on the multiswitch. These paths, namely path 1002 from FTM 300 to IRD 308, and path 1004 from IRD 308 to FTM 300, are shown. The power injector 302 typically uses a 24 V signal 1006, which is also used to supply power to the circuits in the power injector 302. Signal 1006 may be at other voltages, e.g., 30 VDC, without departing from the scope of the present invention.

Path 1004 shows a voltage detection circuit at the IRD input 1000, which needs to be capable of detecting signals with a frequency of 22 kHz up to 88 kHz, which are the signals used to select ports at the multiswitch.

Path 1002 shows a current detection circuit at the FTM output 310, which needs to be capable of detecting signals with a frequency up to 88 KHz*4 and a detection circuit that can detect a delta current of 45 mA or higher.

Paths 1002 and 1004 are isolated, since if they are not isolated from each other, there is a substantial risk of oscillation. To obtain this isolation there is a blocking mechanism in both directions. If the DiSEqC signal travels from IRD 308 to FTM 300, or vice versa, then one of the paths 1002 or 1004 is disabled by switches 1008, 1010, 1012, and 1014. As the present invention uses a half duplex system, there are no problems with disabling one direction while the other direction is active. The path 1002 or 1004, whichever is first active, disables the other path.

The power injector 302 performs additional functions in the FTM 300 schema of the present invention. The power injector 302 also translates voltages so that each control path 1002 and 1004 operates without collisions.

Since the power injector 302 also has access to the power lines within a house, the power injector can also send signals along the house's internal power lines to IRDs 308.

Smart Splitter

Figure 11:
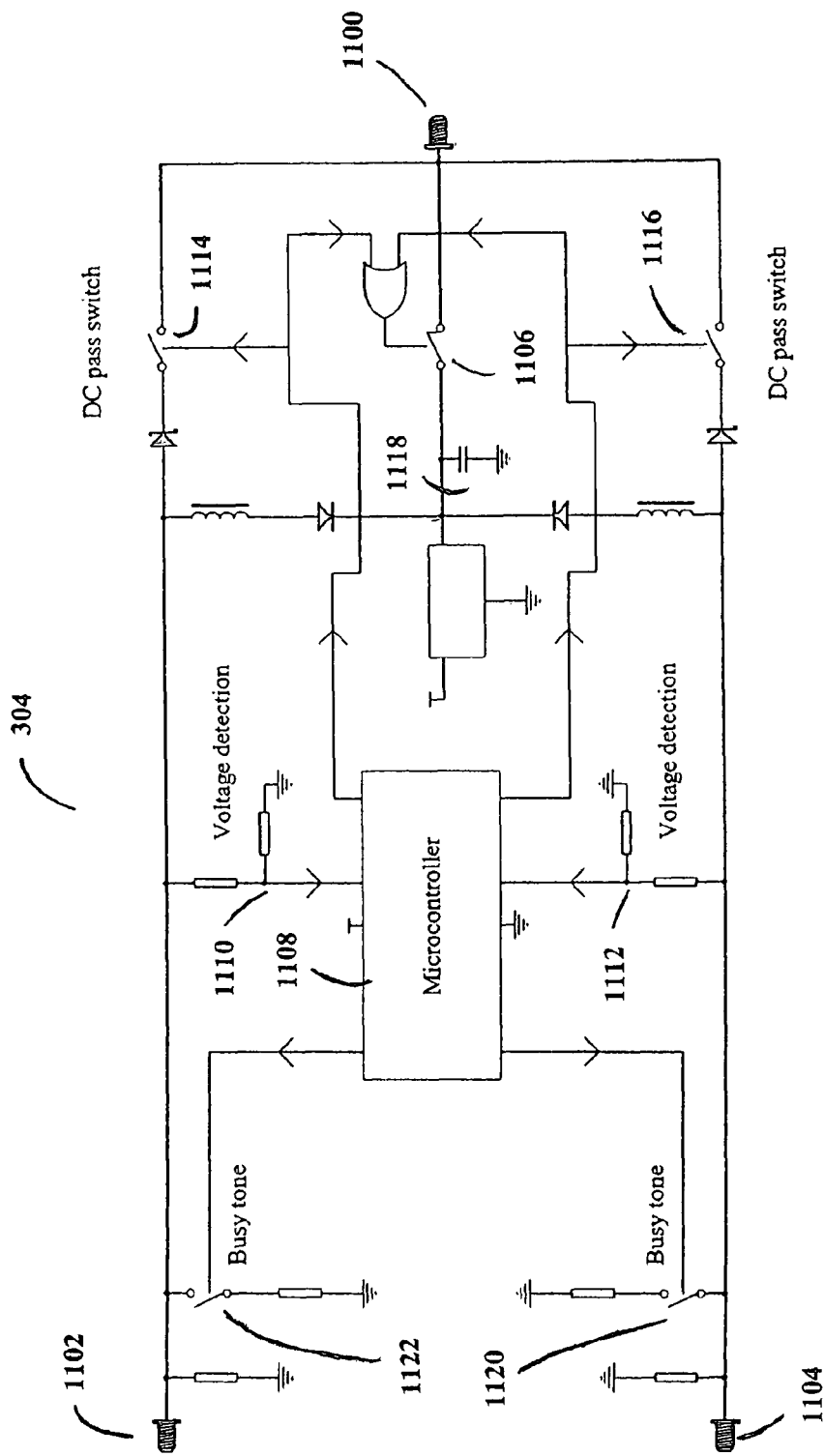
FIGS. 11 and 12 illustrate signal splitters in accordance with the present invention.
Figure 12:
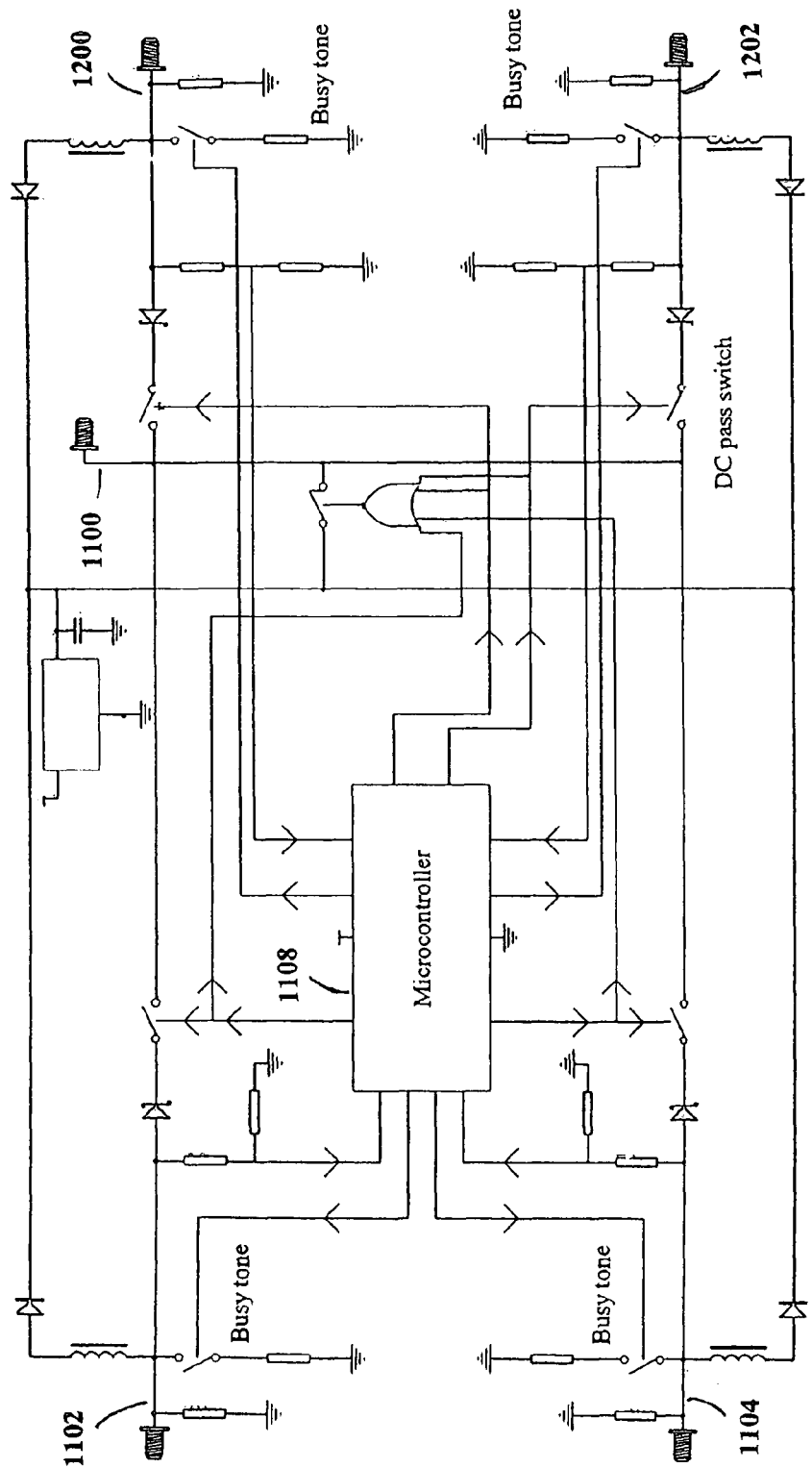

FIGS. 11 and 12 illustrate signal splitters in accordance with the present invention.

A block diagram of two-way splitter 304 is shown, with the RF signal input 1100 and two RF signal outputs 1102 and 1104. The RF signal input 1100 is upstream of the RF signal outputs 1102 and 1104 for the satellite downlink signals 120; in other words, RF signal input is connected closer to the FTM 300 than the RF signal outputs 1102 and 1104 for a given two-way splitter 304. RF signal input 1100 may be coupled directly to FTM 300, but RF signal input 1100 may also be connected to another two-way splitter 304 or four-way splitter 306, in which case RF signal input 1100 would be coupled to an RF output 1104.

The RF signal outputs 1102 and 1104 are also "reverse" inputs for commands that travel from the IRD 308 to the FTM 300. As such, the two-way splitter 304 acts as a priority switch. When both RF signal outputs 1102 and 1104 have a DC voltage below 15 volts, the highest voltage present on the RF signal outputs 1102 and 1104 is transferred through switch 1106 to RF signal input 1100. This allows power for other two-way splitters 304 or four-way splitters 306 that are coupled upstream (closer to the FTM 300) to be transferred for power needs of other splitters 304 or 306.

Microcontroller 1108 polls RF signal outputs 1102 and 1104 for voltage and tone signals. This is typically done by looking for a voltage at junctions 1110 and 1112, but can be performed in other ways without departing from the scope of the present invention. When the microprocessor 1108 detects a voltage above a certain threshold, then the microprocessor closes one of switches 1114 or 1116. The threshold is typically 16 volts, but can be a different voltage without departing from the scope of the present invention. For example, if microprocessor 1108 detects a voltage of 18 volts at junction 1110, then microprocessor 1108 closes switch 1114. Substantially at the same time, microprocessor 1108 opens switch 1106 to avoid the signal from charging capacitor 1118.

If the microprocessor 1108 sees that the other RF signal output 1104 (as an example) also goes above a certain threshold, the microprocessor closes switch 1120 to inform the IRD 308 that is requesting FTM 300 attention that FTM 300 is busy. Once microprocessor 1108 sees that the voltage at junction 1110 has dropped below the threshold voltage, the microprocessor 1108 will open switch 1114, close switch 1116, and open switch 1120 to allow the IRD 308 coupled to RF signal output 1104 to communicate with FTM 300.

FIG. 12 illustrates a four-way splitter 306 of the present invention, which operates similarly to the two-way splitter 304 described with respect to FIG. 11, but has additional RF signal outputs 1200 and 1202 attached.

Maintenance

The FTM 300 allows for registration of the configuration of the house as installed by the installer, including the signal losses/AGC and time of transmission numbers, ODU 108/IRD 308/FTM 300 registration serial numbers, etc., which are all registered at the time of installation. If the phone line remains installed and connected to the IRD 308 and/or FTM 300, the FTM 300 can verify the serial numbers, AGC and signal loss numbers, etc. and transmit these numbers to the service provider for use in troubleshooting and/or maintenance of the installed system. If there is a problem, or the installation configuration changes, the FTM 300 can detect this and attempt repairs and/or record new data for analysis. Such data may also be useful for fraud detection.

Configuration Discovery

This allows the system to discover whether or not an FTM 300 is installed in the system, as well as ensuring proper connection of the multiswitch and other system components.

IRD 308, during initial setup, must determine if there is an FTM 300 installed in the system; otherwise, IRD 308 will not have a private channel and will be required to act as a legacy IRD 112. A command is sent that FTM 300 will understand (88 kHz, 1/0 format) that will not be understood by a non-FTM 300 system. IRD 308 then waits for a specific amount of time, and either tries again (or x number of times) or performs a timeout routine. If a proper response is received, then IRD 308 knows there is an FTM 300 installed, and communication between IRD (with optional serial # encoding) and FTM (with optional serial # encoding) is established. Otherwise, no FTM 300 is present, and IRD 308 acts as a Legacy IRD 112.

Other discovery issues include ensuring that the ODU 108 was set up properly, by sending 13/18 VDC and 22 kHz tones to make sure each port of the multiswitch is properly connected.

Security and Fraud Prevention

With the present invention, associations are created between ODU 108, FTM 300, and IRDs 308 such that each FTM 300 knows which IRDs 308 should be receiving signals. The data used to create these associations are created during initial installation, or upgrades to the installation that are performed by customers or installation personnel. Currently, there are minimal checks to see if an IRD 308 is a valid IRD 308 for a given account after the initial registration process.

The present invention allows for additional checking to ensure that a given IRD 308 is receiving signals from the proper FTM 300/ODU 108 pairing. For example, and not by way of limitation, a customer can purchase an IRD 308 and call the service provider for authorization to install the IRD 308. Once installed, the IRD 308 must register through a specific FTM 300. The association between that IRD 308 and that FTM 300 prevents the IRD 308 from being moved to a new FTM 300 at another location, because the authorization codes for the second FTM 300 do not authorize that FTM 300 to pass signals through to the moved IRD 308.

Further, AGC changes (changes in signal strength between FTM 300 and IRD 308) may alert the provider that a change in the in-home wiring has occurred. Some changes may be authorized, e.g., a subscriber has been authorized to install another IRD 308, or has moved an IRD 308 from one room to another. However, large deltas in AGC can signal a possible fraudulent use situation. For example, and not by way of limitation, two neighbors can agree to use a single ODU 108 to feed one IRD 308 located in one house and another IRD 308 located in the neighbor's household. The cabling run to the house without the ODU 108 will be much longer than the cable run into the first household, and thus, the AGC level required to drive the IRD 308 in the house without the ODU 108 will be much higher than the AGC level to drive the first IRD 308. Such installations, even if authorized, can be a signal of possible fraudulent use. Time of travel over the cable wire, as well as signal loss (which AGC overcomes), and other methods can also be used during registration and/or modification of the system to determine possible fraudulent activity.

Further, the FTM 300 architecture now only requires that one IRD 308 has access to a telephone line, rather then each IRD 308. The phone line communications and authorizations can be sent from one IRD 308 to the service provide because the FTM 300 can communicate with all IRDs 308, and such data can be sent from the FTM 300 through any IRD 308 that has telephone connections. If there are no IRDs 308 connected to a phone line, the FTM 300 can stop delivery of signals to the IRDs 308 until there is a phone connection, which can be determined by the phone signaling voltages present on phone lines. The phone connection can be also checked on a periodic (random) basis, or can be verified via other methods, such as call in registration for services via IRD 308, etc.

Alternative Embodiments and Features

The 13/18 VDC and 22/88 kHz protocol described herein is only one protocol that can be used within the scope of the present invention. Other protocols, e.g., ethernet, or other custom designed protocols, can be used without departing from the scope of the present invention. The 88 kHz signal (DiSeqC 1.0 uses 22 kHz) is just one example of a customized signal; other protocols, other bit patterns, other commands can be used instead.

Phone lines can also be used for communication between IRDs/FTM or IRD-IRD directly.

Although described with respect to IRD 308, any IRD 308 is interchangeable with PVR 504 in terms of commands and RF signal delivery.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

A system for delivering satellite signals to at least one Integrated Receiver Decoder (IRD) in accordance with the present invention comprises a plurality of inputs, designed to receive a plurality of satellite signals, wherein the satellite signals are directed to the inputs based on an originating satellite for each of the satellite signals, an automatic level controller, coupled to the inputs, for adjusting a signal strength associated with each the satellite signals such that each of the signal strengths are within a predetermined range, a multiswitch, having a plurality of inputs and a plurality of outputs, wherein at least one input of the multiswitch is coupled to the automatic level controller, and an interface, wherein at least one of the outputs of the multiswitch provides a signal to the interface, such that at least one new IRD coupled to an output of the interface receives a portion of a satellite signal based on commands sent to the interface from the new IRD.

Other features of the present invention comprise a second output of the multiswitch is a legacy output, wherein each legacy output selects an entire polarization of a satellite signal based on a Legacy IRD command sent directly to the multiswitch, the interface being a network interface, a controller, coupled to the plurality of outputs, for controlling signal flow between the multiswitch and the at least one new IRD, a network tuner, coupled between the output of the multiswitch and the interface, controlled by a service provider, each new IRD coupled to the multiswitch receiving signals on separate private channels in a respective fashion, and wherein the controller monitors a signal strength of the outputs of the interface and a signal strength of the legacy output. Additional features of the present invention also include the controller monitoring an identification of each new IRD and each legacy IRD coupled to the outputs of the microswitch, the controller refusing commands from a monitored IRD based on at least one of the group consisting of: the identification of the monitored ID, and the signal strength of the outputs of the interface, the automatic level controller reducing satellite signal strengths that are outside of the predetermined range, an automatic gain controller, coupled between the multiswitch and the interface, for controlling a portion signal strength of the portions of the satellite signals, the signal strength associated with a given new IRD is controlled based on a measurement made of conditions existing between the given new IRD and the interface, when the measurement exceeds a maximum value, commands received from the given new IRD are ignored by the automatic level controlled system, a plurality of tuners, coupled between the multiswitch and the interface, wherein each tuner is controlled by new IRDs in a respective fashion, a network tuner, coupled between the multiswitch and the interface, wherein the network tuner is controlled by a service provider and cannot be controlled by any new IRD, and where an output of the interface is a combined signal.

Other features include where the combined signal comprises a plurality of individual signals, a first individual signal comprising an output of the network tuner, and successive individual signals comprising signals selected by each of the new IRDs coupled to the interface in a respective fashion, and wherein each new IRD coupled to the interface receives the entire combined signal and tunes to the individual signals based on a mapping generated by the automatic level controlled system.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. An automatic level controlled system for delivering satellite signals to at least one Integrated Receiver Decoder (IRD), comprising:

a plurality of satellite inputs, designed to receive a plurality of satellite signals, wherein the satellite signals are directed to the inputs based on an originating satellite for each of the satellite signals;

a multiswitch having a plurality of inputs and a plurality of outputs;

an automatic level controller, coupled directly to the multiswitch and between the inputs of the multiswitch and the satellite inputs, for individually adjusting signal strengths associated with each of the satellite signals such that each of the signal strengths as individually adjusted are within a predetermined range, the predetermined range being determined by a dynamic range of the multiswitch; and an interface, wherein at least one of the outputs of the multiswitch provides a signal to the interface, such that at least one IRD coupled to an output of the interface receives a portion of a satellite signal based on commands sent to the interface from the IRD.

2. The automatic level controlled system of claim 1, wherein at least a second output of the multiswitch is a legacy output, wherein each legacy output selects an entire polarization of a satellite signal based on a Legacy IRD command sent directly to the multiswitch.

3. The automatic level controlled system of claim 2, wherein the interface is a network interface.

4. The automatic level controlled system of claim 2, further comprising a controller, coupled to the plurality of outputs, for controlling signal flow between the multiswitch and the at least one IRD.

5. The automatic level controlled system of claim 4, further comprising a network tuner, coupled between the output of the multiswitch and the interface, controlled by a service provider.

6. The automatic level controlled system of claim 5, wherein each IRD coupled to the multiswitch receives signals on separate private channels in a respective fashion.

7. The automatic level controlled system of claim 4, wherein the controller monitors a signal strength of the outputs of the interface and a signal strength of the legacy output.

8. The automatic level controlled system of claim 4, wherein the controller monitors an identification of each IRD and each legacy IRD coupled to the outputs of the multiswitch.

9. The automatic level controlled system of claim 8, wherein the controller refuses commands from a monitored IRD based on at least one of the group consisting of: the identification of the monitored ID, and the signal strength of the outputs of the interface.

10. The automatic level controlled system of claim 4, wherein the automatic level controller reduces satellite signal strengths that are outside of the predetermined range.

11. The automatic level controlled system of claim 1, further comprising an automatic gain controller, coupled between the multiswitch and the interface, for controlling a portion signal strength of the portions of the satellite signals.

12. The automatic level controlled system of claim 11, wherein the portion signal strength associated with a given IRD is controlled based on a measurement made of conditions existing between the given IRD and the interface.

13. The automatic level controlled system of claim 12, wherein when the measurement exceeds a maximum value, commands received from the given IRD are ignored by the automatic level controlled system.

14. The automatic level controlled system of claim 13, further comprising a plurality of tuners, coupled between the multiswitch and the interface, wherein each tuner is controlled by IRDs in a respective fashion.

15. The automatic level controlled system of claim 14, further comprising a network tuner, coupled between the multiswitch and the interface, wherein the network tuner is controlled by a service provider and cannot be controlled by any IRD.

16. The automatic level controlled system of claim 15, wherein an output of the interface is a combined signal.

17. The automatic level controlled system of claim 16, wherein the combined signal comprises a plurality of individual signals, a first individual signal comprising an output of the network tuner, and successive individual signals comprising signals selected by each of the IRDs coupled to the interface in a respective fashion.

18. The automatic level controlled system of claim 17, wherein each IRD coupled to the interface receives the entire combined signal and tunes to the individual signals based on a mapping generated by the automatic level controlled system.

19. An automatic level controlled system for selectively delivering satellite video signals to at least one Integrated Receiver Decoder (IRD), comprising:
a multiswitch having a plurality of inputs and a plurality of outputs; and
an automatic level controller, coupled directly between the plurality of inputs of the multiswitch and a plurality of low noise block amplifiers, wherein each of the low noise block amplifiers receives satellite signals of different signal strengths, wherein the multiswitch selectively delivers a portion of the satellite signals to at least one IRD based on commands sent to the multiswitch from the at least one IRD; wherein the automatic level controller individually adjusts each of the received satellite signals and provides the individually adjusted received satellite signals to the multiswitch after restricting the signal strengths within a predetermined range, the predetermined range being determined by a dynamic range of the multiswitch.

20. A satellite signal delivery system, for selectively delivering satellite video signals to at least one Integrated Receiver Decoder (IRD), comprising:
a multiswitch; and
an automatic level controller, coupled between inputs of the satellite signal video signals and the multiswitch, wherein the multiswitch selectively delivers a portion of the satellite signals to at least one IRD, wherein the automatic level controller individually adjusts a signal strength of a given satellite video signal independent of another satellite video signal to be within a predetermined range of acceptable signal strengths for the multiswitch, the predetermined range being determined by a dynamic range of the multiswitch.

* * * * *